(12) United States Patent
Sabapathy et al.

(10) Patent No.: US 12,217,013 B2
(45) Date of Patent: Feb. 4, 2025

(54) MACHINE-LEARNING BASED TRANSCRIPT SUMMARIZATION

(71) Applicant: UnitedHealth Group Incorporated, Minnetonka, MN (US)

(72) Inventors: Rajesh Sabapathy, Haryana (IN); Chirag Mittal, Haryana (IN); Gourav Awasthi, Haryana (IN); Aditya Teja Josyula, Collierville, TN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 228 days.

(21) Appl. No.: 17/937,616

(22) Filed: Oct. 3, 2022

(65) Prior Publication Data

US 2023/0419051 A1 Dec. 28, 2023

Related U.S. Application Data

(60) Provisional application No. 63/366,797, filed on Jun. 22, 2022.

(51) Int. Cl.
*G06F 40/56* (2020.01)
*G06F 40/247* (2020.01)
(Continued)

(52) U.S. Cl.
CPC ............ *G06F 40/56* (2020.01); *G06F 40/247* (2020.01); *G06F 40/30* (2020.01); *G06F 40/35* (2020.01); *G06N 5/022* (2013.01)

(58) Field of Classification Search
CPC ......... G06F 40/56; G06F 40/35; G06F 40/247
See application file for complete search history.

(56) References Cited

U.S. PATENT DOCUMENTS

| 6,996,414 B2 | 2/2006 | Vishwanathan et al. |
| 7,318,031 B2 | 1/2008 | Bantz et al. |

(Continued)

FOREIGN PATENT DOCUMENTS

| EP | 3839850 A1 | 6/2021 |
| KR | 10-2022-0154592 A | 11/2022 |

OTHER PUBLICATIONS

Advisory Action (PTOL-303) Mailed on Jun. 27, 2024 for U.S. Appl. No. 17/405,555, 2 page(s).
(Continued)

*Primary Examiner* — Ibrahim Siddo
(74) *Attorney, Agent, or Firm* — Alston & Bird LLP

(57) ABSTRACT

There is a need for more effective and efficient predictive natural language summarization. This need is addressed by applying hybrid extractive and abstractive summarization techniques in a unique processing pipeline to generate a cohesive and comprehensive summary of a multi-party interaction. A method for generating the summary of a multi-party interaction includes receiving a multi-party interaction transcript data object comprising a plurality of interaction utterances from at least two participants; using an extractive summarization model to identify a key sentence of the multi-party interaction transcript data object; identifying an interaction utterance from the multi-party interaction transcript data object that corresponds to the key sentence; generating a contextual summary for the multi-party interaction transcript data object based at least in part on the interaction utterance; and generating a reported contextual summary for the multi-party interaction transcript data object based at least in part on the contextual summary.

20 Claims, 13 Drawing Sheets

(51) Int. Cl.
   *G06F 40/30* (2020.01)
   *G06F 40/35* (2020.01)
   *G06N 5/022* (2023.01)

(56) References Cited

U.S. PATENT DOCUMENTS

| | | | |
|---|---|---|---|
| 7,702,508 | B2 | 4/2010 | Bennett |
| 7,849,147 | B2 | 12/2010 | Rohall et al. |
| 7,865,560 | B2 | 1/2011 | Rohall et al. |
| 7,886,012 | B2 | 2/2011 | Bedi et al. |
| 8,750,489 | B2 | 6/2014 | Park |
| 8,825,478 | B2 | 9/2014 | Cox et al. |
| 8,914,452 | B2 | 12/2014 | Boston et al. |
| 8,983,840 | B2 | 3/2015 | Deshmukh et al. |
| 9,116,984 | B2 | 8/2015 | Caldwell et al. |
| 9,118,759 | B2 | 8/2015 | Krishnapuram et al. |
| 9,300,790 | B2 | 3/2016 | Gainsboro et al. |
| 9,348,817 | B2 | 5/2016 | Bohra et al. |
| 9,413,877 | B2 | 8/2016 | Aldrich et al. |
| 9,565,301 | B2 | 2/2017 | Lee et al. |
| 10,009,464 | B2 | 6/2018 | Slovacek |
| 10,051,122 | B2 | 8/2018 | Raanani et al. |
| 10,204,158 | B2 | 2/2019 | Hay et al. |
| 10,353,904 | B2 | 7/2019 | Enders et al. |
| 10,354,677 | B2 | 7/2019 | Mohamed et al. |
| 10,628,474 | B2 | 4/2020 | Modani et al. |
| 10,637,898 | B2 | 4/2020 | Cohen et al. |
| 10,659,585 | B1 | 5/2020 | Graham et al. |
| 10,785,185 | B2 | 9/2020 | Vennam et al. |
| 10,817,787 | B1 | 10/2020 | Zhang |
| 11,018,885 | B2 | 5/2021 | Niekrasz |
| 11,070,673 | B1 | 7/2021 | Lemus et al. |
| 11,074,284 | B2 | 7/2021 | Cunico et al. |
| 11,115,353 | B1 | 9/2021 | Crowley et al. |
| 11,228,681 | B1 | 1/2022 | Rosenberg |
| 11,232,266 | B1 | 1/2022 | Biswas et al. |
| 11,262,978 | B1 | 3/2022 | Cohen et al. |
| 11,272,058 | B2 | 3/2022 | Khafizov et al. |
| 11,315,569 | B1 | 4/2022 | Talieh et al. |
| 11,487,797 | B2 | 11/2022 | Shukla et al. |
| 11,500,951 | B1 | 11/2022 | Shetty |
| 2009/0259642 | A1 | 10/2009 | Cao et al. |
| 2010/0076978 | A1 | 3/2010 | Cong et al. |
| 2010/0088299 | A1 | 4/2010 | O'Sullivan et al. |
| 2010/0287162 | A1 | 11/2010 | Shirwadkar |
| 2012/0209590 | A1 | 8/2012 | Huerta et al. |
| 2013/0151533 | A1* | 6/2013 | Udupa .............. G06F 16/3325 707/742 |
| 2014/0200928 | A1 | 7/2014 | Watanabe et al. |
| 2015/0154956 | A1 | 6/2015 | Brown |
| 2015/0193429 | A1 | 7/2015 | Bohra et al. |
| 2016/0196492 | A1 | 7/2016 | Johnson et al. |
| 2016/0277577 | A1 | 9/2016 | Yentis et al. |
| 2016/0350283 | A1 | 12/2016 | Carus et al. |
| 2017/0054837 | A1 | 2/2017 | Choi et al. |
| 2018/0351887 | A1* | 12/2018 | Efrati .............. G06Q 50/06 |
| 2019/0042645 | A1 | 2/2019 | Othmer et al. |
| 2019/0122142 | A1 | 4/2019 | Brunn et al. |
| 2019/0297186 | A1 | 9/2019 | Karani |
| 2019/0340296 | A1 | 11/2019 | Cunico et al. |
| 2019/0373111 | A1 | 12/2019 | Rute et al. |
| 2019/0386937 | A1 | 12/2019 | Kim |
| 2020/0074312 | A1 | 3/2020 | Liang et al. |
| 2020/0137224 | A1 | 4/2020 | Rakshit et al. |
| 2020/0184155 | A1 | 6/2020 | Galitsky |
| 2020/0193095 | A1 | 6/2020 | Fan et al. |
| 2020/0218722 | A1 | 7/2020 | Mai et al. |
| 2020/0227026 | A1 | 7/2020 | Rajagopal et al. |
| 2020/0311738 | A1 | 10/2020 | Gupta et al. |
| 2020/0311739 | A1 | 10/2020 | Chopra et al. |
| 2020/0334419 | A1 | 10/2020 | Raanani et al. |
| 2020/0401765 | A1 | 12/2020 | Ran et al. |
| 2021/0034707 | A1 | 2/2021 | Podgorny et al. |
| 2021/0133251 | A1 | 5/2021 | Tiwari et al. |
| 2021/0182326 | A1 | 6/2021 | Romano et al. |
| 2021/0182491 | A1 | 6/2021 | Chen et al. |
| 2021/0193135 | A1 | 6/2021 | Gavai et al. |
| 2021/0248324 | A1 | 8/2021 | Choudhary |
| 2021/0264897 | A1 | 8/2021 | Churav et al. |
| 2021/0272040 | A1 | 9/2021 | Johnson et al. |
| 2021/0303784 | A1 | 9/2021 | Brdiczka et al. |
| 2021/0304747 | A1 | 9/2021 | Haas et al. |
| 2021/0334469 | A1 | 10/2021 | Feng et al. |
| 2021/0342554 | A1 | 11/2021 | Martin et al. |
| 2021/0375289 | A1 | 12/2021 | Zhu et al. |
| 2021/0390127 | A1 | 12/2021 | Fox et al. |
| 2022/0004971 | A1 | 1/2022 | Kitamura |
| 2022/0030110 | A1 | 1/2022 | Khafizov et al. |
| 2022/0067269 | A1 | 3/2022 | de Oliveira et al. |
| 2022/0068279 | A1 | 3/2022 | Embar et al. |
| 2022/0108086 | A1 | 4/2022 | Wu et al. |
| 2022/0109585 | A1 | 4/2022 | Asthana et al. |
| 2022/0138432 | A1 | 5/2022 | Galitsky |
| 2022/0156464 | A1 | 5/2022 | Norton et al. |
| 2022/0189484 | A1 | 6/2022 | Malladi et al. |
| 2022/0215052 | A1 | 7/2022 | Chalana et al. |
| 2022/0277135 | A1 | 9/2022 | Kryscinski et al. |
| 2022/0337443 | A1 | 10/2022 | Sood et al. |
| 2022/0391595 | A1 | 12/2022 | Shevelev et al. |
| 2022/0392434 | A1 | 12/2022 | Asi et al. |
| 2022/0414338 | A1 | 12/2022 | Cho et al. |
| 2023/0054726 | A1 | 2/2023 | Roy et al. |
| 2023/0057760 | A1 | 2/2023 | Galitsky |
| 2023/0122429 | A1 | 4/2023 | Gunasekara et al. |
| 2023/0315993 | A1 | 10/2023 | Nieborowski et al. |
| 2023/0334072 | A1 | 10/2023 | Matsuzawa et al. |
| 2023/0359657 | A1 | 11/2023 | Ganhotra et al. |
| 2023/0385557 | A1 | 11/2023 | Sabapathy et al. |
| 2023/0419042 | A1 | 12/2023 | Sabapathy et al. |

OTHER PUBLICATIONS

Final Rejection Mailed on Apr. 15, 2024 for U.S. Appl. No. 17/405,555, 25 page(s).

NonFinal Office Action for U.S. Appl. No. 17/405,555, dated Nov. 17, 2023, (23 pages), United States Patent and Trademark Office, US.

Notice of Allowance and Fee(s) Due for U.S. Appl. No. 17/122,607, dated Mar. 28, 2023, (8 pages), United States Patent and Trademark Office, US.

NonFinal Office Action for U.S. Appl. No. 17/122,607, dated Nov. 8, 2022, (58 pages), United States Patent and Trademark Office, US.

Vanetik, Natalia et al. "An Unsupervised Constrained Optimization Approach To Compressive Summarization," Information Sciences, vol. 509, Jan. 2020, pp. 22-35.

"Summarize Text With The Extractive Summarization API," Azure Cognitive Services|Microsoft Docs, Mar. 16, 2022, (6 pages) [Retrieved from the Internet Apr. 5, 2022] <URL: https://docs.microsoft.com/en-us/azure/cognitive-services/language-service/text-summarization/how-to/call-api>.

"Supercharge Your Call Notes—Automated Call Recording and Transcription," Jog.Ai, (6 pages), (online), [Retrieved from the Internet Nov. 15, 2021] <URL: https://jog.ai/>.

"Trustworthy and Cutting Edge AI," The Blue, (12 pages), (online), [Retrieved from the Internet Nov. 12, 2021] <URL: https://theblue.ai/en/>.

Banerjee, Siddhartha et al. "Multi-Document Abstractive Summarization Using ILP Based Multi-Sentence Compression," In Proceedings of the Twenty-Fourth International Joint Conference On Artificial Intelligence (IJCAI 2015), Jan. 2015, pp. 1208-1214.

Baumel, Tal et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).

Baumel, Tal et al. "Topic Concentration in Query-Focused Summarization," Proceedings of the Thirtieth AAAI Conference On Artificial Intelligence (AAAI-16), pp. 2573-2579, Mar. 5, 2016.

Biswas, Pratik K. et al. "Extractive Summarization of Call Transcripts," arXiv Preprint arXiv:2103.10599, Mar. 19, 2021, (10 pages).

(56) References Cited

OTHER PUBLICATIONS

Brin, Sergey. "The PageRank Citation Ranking: Bringing Order To The Web," Proceedings of ASIS, vol. 98, Jan. 29, 1998, (17 pages).
Canhasi, Ercan. "Ercan Canhasi: Query Focused Multi Document Summarization Based on the Multi Facility Location Problem," Computer Science On-Line Conference, Artificial Intelligence Trends In Intelligent Systems, CSOC 2017, Advances In Intelligent Systems and Computing, vol. 573, Springer, Cham., Apr. 7, 2017, pp. 210-219, DOI: 10.1007/978-3-319-57261-1_21.
Carbonell, Jaime et al. "The Use Of MMR, Diversity-Based Reranking For Reordering Documents and Producing Summaries," In Proceedings of the 21st Annual International ACM SIGIR Conference on Research and Development In Information Retrieval, Aug. 1998, pp. 335-336. DOI: 10.1145/290941.291025.
Chandramouli, Aravind et al. "Unsupervised Paradigm For Information Extraction From Transcripts Using BERT," arXiv Preprint arXiv:2110.00949, Oct. 3, 2021, (11 pages).
Chen, Yun-Nung et al. "Intra-Speaker Topic Modeling For Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.
Dang, Hoa Trang. "Overview of DUC 2005," In Proceedings of the Document Understanding Conference, Oct. 9, 2005, vol. 2005, (12 pages). [Available online: https://www-nlpir.nist.gov/projects/duc/pubs/2005papers/OVERVIEW05.pdf].
Devlin, Jacob et al. "BERT: Pre-Training of Deep Bidirectional Transformers for Language Understanding," Proceedings of NAACL-HLT 2019, Jun. 2, 2019, pp. 4171-4186.
Feigenblat, Guy et al. "Unsupervised Query-Focused Multi-Document Summarization Using The Cross Entropy Method," SIGIR '17: Proceedings of the 40th International ACM SIGIR Conference On Research and Development In Information Retrieval, Aug. 7, 2017, pp. 961-964, DOI: 10.1145/3077136.3080690.
Filatova, Elena et al. "Event-Based Extractive Summarization," In Proceedings of ACL Workshop on Summarization, vol. 111, (2004), (8 pages).
Garg, Nikhil et al. "ClusterRank: A Graph Based Method For Meeting Summarization," IDIAP Research Institute, Jun. 2009, (5 pages), Martigny, Switzerland.
Garg, Nikhil et al. "Clusterrank: A Graph Based Method For Meeting Summarization," Proceedings of the 10th International Conference of the International Speech Communication Association (Interspeech 2009), pp. 1499-1502, Sep. 6, 2009, Brighton, United Kingdom.
Gillick, Dan et al. "A Scalable Global Model For Summarization," In Proceedings of the NAACL HLT Workshop On Integer Linear Programming For Natural Language Processing, Jun. 2009, pp. 10-18.
Goldstein, Jade et al. "Summarization: (1) Using MMR for Diversity- Based Reranking and (2) Evaluating Summaries," Carnegie-Mellon University, Language Technologies Institute, Tipster III Summarization Project, Oct. 1, 1998, pp. 181-195.
Gupta, Surabhi et al. "Measuring Importance and Query Relevance In Topic-Focused Multi-Document Summarization," 45th Annual Meeting of the Association for Computational Linguistics Demo and Poster Sessions, Jun. 2007, pp. 193-196.
Hearst, Marti A. "Text-Tiling: A Quantitative Approach To Discourse Segmentation," Association for Computational Linguistics 1993 (1993), pp. 1-10.
Higashinaka, Ryuichiro et al. "Improving HMM-Based Extractive Summarization For Multi-Domain Contact Center Dialogues," In 2010 IEEE Spoken Language Technology Workshop, Dec. 12, 2010, pp. 61-66. DOI: 10.1109/SLT.2010.5700823.
Kothadiya, Aditya. "Why We Built A Note Taking Software—A Tool That Automatically Takes Notes And Analyzes Sales and Customer Calls," Avoma Blog, (article, online), [Retrieved from the Internet Nov. 15, 2021] <https://www.avoma.com/blog/ai-note-taking-software>.

Li, Chen et al. "Using Supervised Bigram-Based ILP for Extractive Summarization," In Proceedings of the 51st Annual Meeting of the Association For Computational Linguistics, Aug. 4, 2013, pp. 1004-1013, Sofia, Bulgaria.
Liang, Xinnian et al. "Unsupervised Keyphrase Extraction By Jointly Modeling Local and Global Context," arXiv Preprint arXiv:2109.07293v1 [cs.CL], Sep. 15, 2021, (10 pages).
Liu, Yang et al. "Text Summarization With Pretrained Encoders," arXiv Preprint arXiv:1908.08345v2 [cs.CL], Sep. 5, 2019, (11 pages).
McDonald, Ryan. "A Study Of Global Inference Algorithms In Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].
Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].
Mihalcea, Rada et al. "Textrank: Bringing Order Into Texts," In Proceedings of the 2004 Conference On Empirical Methods In Natural Language Processing, Jul. 2004, pp. 404-411. [Available online: https://www.aclweb.org/anthology/W04-3252.pdf].
Murray, Gabriel et al. "Generating and Validating Abstracts Of Meeting Conversations: A User Study," In Proceedings of the 6th International Natural Language Generation Conference (2010), (9 pages). [Available online: https://www.aclweb.org/anthology/W10-4211.pdf].
Narayan, Shashi et al. "Stepwise Extractive Summarization and Planning With Structured Transformers," arXiv Preprint arXiv:2010.02744v1 [cs.CL], Oct. 6, 2020, (17 pages).
Nenkova, Ani et al. "The Impact Of Frequency On Summarization," Technical Report MSRTR-2005-101, Microsoft Research, Jan. 2005, (9 pages), Redmond, Washington. [Available online: http://citeseerx.ist.psu.edu/viewdoc/download?doi=10.1.1.529.6099&rep=rep1&type=pdf].
Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].
Padmakumar, Vishakh et al. "Unsupervised Extractive Summarization Using Pointwise Mutual Information," arXiv Preprint arXiv:2102.06272v2 [cs.CL], Mar. 22, 2021, (8 pages).
Radev, Dragomir R. et al. "Ranking Suspected Answers To Natural Language Questions Using Predictive Annotation," ANLC '00: Proceedings of the Sixth Conference On Applied Natural Language Processing, Apr. 29, 2000, pp. 150-157, https://doi.org/10.3115/974147.974168.
Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.
Rudra, Koustav et al. "Summarizing Situational Tweets in Crisis Scenarios: An Extractive-Abstractive Approach," IEEE Transactions On Computational Social Systems, Sep. 16, 2019, vol. 6, No. 5, pp. 981-993.
Rudra, Koustav. "Extracting and Summarizing Information From Microblogs During Disasters," Ph.D. Thesis, Apr. 2018, (199 pages).
Shang, Guokan et al. "Unsupervised Abstractive Meeting Summarization with Multi-Sentence Compression and Budgeted Submodular Maximization," In Proceedings of the 56th Annual Meeting Of The Association For Computational Linguistics (Long Papers), Jul. 15, 2018, pp. 664-674, Melbourne, Australia. [Available online: https://www.aclweb.org/anthology/P18-1062.pdf].
Singer, Eleanor et al. "Some Methodological Uses of Responses To Open Questions and Other Verbatim Comments In Quantitative Surveys," Methods, Data, Analyses: A Journal For Quantitative Methods and Survey Methodology (mda), vol. 11, No. 2, (2017), pp. 115-134, DOI: 10.12758/mda.2017.01.

(56) References Cited

OTHER PUBLICATIONS

Steinberger, Josef et al. "Evaluation Measures for Text Summarization," Computing and Informatics, vol. 28, Mar. 2, 2009, pp. 1001-1026.
Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.
Sun, Xu et al. "Feature-Frequency-Adaptive On-Line Training For Fast and Accurate Natural Language Processing," Computational Linguistic, vol. 40, No. 3, Sep. 1, 2014, pp. 563-586.
Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.
Ushio, Asahi et al. "Back To The Basics: A Quantitative Analysis of Statistical and Graph-Based Term Weighting Schemes For Keyword Extraction," arXiv Preprint arXiv:210408028v2 [cs.LG], Sep. 13, 2021, (15 pages), United Kingdom.
Vanetik, Natalia et al. "Query-Based Summarization Using MDL Principle," Proceedings of the MultiLing 2017 Workshop On Summarization and Summary Evaluation Across Source Types and Genres, Association for Computational Linguistics, pp. 22-31, Apr. 3, 2017, Valencia, Spain.
Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.
Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.
Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.
Ma, Bing et al. "Extractive Dialogue Summarization Without Annotation Based On Distantly Supervised Machine Reading Comprehension In Customer Service," In IEEE/ACM Transactions on Audio, Speech, and Language Processing, vol. 30, pp. 87-97 Jan. 1, 2022, (Year: 2022).
Notice of Allowance and Fee(s) Due, for U.S. Appl. No. 17/815,817, dated Mar. 30, 2023, (12 pages), United States Patent and Trademark Office, US.
Yih, Wen-tau et al. "Multi-Document Summarization By Maximizing Informative Content-Words," In IJCAI, Jan. 6, 2007, vol. 7, pp. 1776-1782. [Available online: https://www.aaai.org/Papers/IJCAI/2007/IJCAI07-287.pdf].
Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.
Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.
Zhong, Junmei et al. "Predicting Customer Call Intent By Analyzing Phone Call Transcripts Based On CNN For Multi-Class Classification," Computer Science & Information Technology (CS & IT), pp. 9-20, arXiv preprint arXiv:1907.03715, Jul. 8, 2019, (12 pages), available online: https://arxiv.org/ftp/arxiv/papers/1907/1907.03715.pdf.
Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.
Zweig, Geoffrey et al. "Automated Quality Monitoring For Call Centers Using Speech and NLP Technologies," Proceedings of the Human Language Technology Conference of the NAACL, Companion vol. pp. 292-295, Jun. 2006.
Non-Final Rejection Mailed on Aug. 14, 2024 for U.S. Appl. No. 17/405,555, 29 page(s).
Non-Final Rejection Mailed on Oct. 17, 2024 for U.S. Appl. No. 17/937,606, 33 page(s).
Non-Final Rejection Mailed on Oct. 28, 2024 for U.S. Appl. No. 17/938,089, 6 page(s).

\* cited by examiner

600

515
....
YOU DON'T HAVE ANY BUILT IN TRANSPORTATION, BUT LIKE I SAID I CAN GO AHEAD AND CHECK TO SEE IF THERE'S A SOCIAL SERVICE PROGRAM WE CAN USE ABOUT THAT.
....
NOW THERE IS A WEBSITE CALLED ELDER CARE AND THE OFFER SORTS OF THINGS LIKE THAT LIKE MEALS, TRANSPORTATION, THINGS LIKE THAT.
....

625 ⇕

505
....
AGENT: LISTEN. OK, YEAH, SO UNFORTUNATELY IT DOES LOOK LIKE IN YOUR CURRENT BENEFITS. YOU DON'T HAVE ANY BUILT IN TRANSPORTATION, BUT LIKE I SAID I CAN GO AHEAD AND CHECK TO SEE IF THERE'S A SOCIAL SERVICE PROGRAM WE CAN USE ABOUT THAT. WHY DON'T WE JUMP OVER TO MEALS 'CAUSE I HAVE THAT HERE IN FRONT OF ME AND IT DOES NOT LOOK LIKE YOU HAVE ANY COVERAGE FOR MEALS AS WELL. BUT JUST LIKE THE TRANSPORTATION, UH, THAT'S SOMETHING THAT I CAN LOOK INTO. THERE MIGHT BE A SOCIAL SOCIAL SERVICE PROGRAM IN YOUR AREA THAT MIGHT DO THAT, SO ACTUALLY, SO LET ME GO AHEAD AND RESEARCH.
CALLER: OK.
....
CALLER: OK.
AGENT: NOW THERE IS A WEBSITE CALLED ELDER CARE AND THE OFFER SORTS OF THINGS LIKE THAT LIKE MEALS, TRANSPORTATION, THINGS LIKE THAT. SO LET ME GO AHEAD AND PULL THAT UP AND LET'S SEE WHAT WE GOT. OK ALRIGHT THANK YOU JUST ABOUT.
CALLER: OK.
....

650 ⇗

605
610 / 615
....
LISTEN. OK, YEAH, SO UNFORTUNATELY IT DOES LOOK LIKE IN YOUR CURRENT BENEFITS. YOU DON'T HAVE ANY BUILT IN TRANSPORTATION, BUT LIKE I SAID I CAN GO AHEAD AND CHECK TO SEE IF THERE'S A SOCIAL SERVICE PROGRAM WE CAN USE ABOUT THAT. WHY DON'T WE JUMP OVER TO MEALS 'CAUSE I HAVE THAT HERE IN FRONT OF ME AND IT DOES NOT LOOK LIKE YOU HAVE ANY COVERAGE FOR MEALS AS WELL. BUT JUST LIKE THE TRANSPORTATION, UH, THAT'S SOMETHING THAT I CAN LOOK INTO. THERE MIGHT BE A SOCIAL SOCIAL SERVICE PROGRAM IN YOUR AREA THAT MIGHT DO THAT, SO ACTUALLY, SO LET ME GO AHEAD AND RESEARCH.
....
NOW THERE IS A WEBSITE CALLED ELDER CARE AND THE OFFER SORTS OF THINGS LIKE THAT LIKE MEALS, TRANSPORTATION, THINGS LIKE THAT. SO LET ME GO AHEAD AND PULL THAT UP AND LET'S SEE WHAT WE GOT. OK ALRIGHT THANK YOU JUST ABOUT.
....

1205
INFORMED MEMBER THAT THEY DO NOT HAVE ANY BUILT IN TRANSPORTATION, AND I CAN GO AHEAD AND CHECK TO SEE IF THERE IS A SOCIAL SERVICE PROGRAM WE CAN USE ABOUT THAT. CONFIRMED MEMBER THAT I HAVE THAT HERE IN FRONT OF ME AND IT DOES NOT LOOK LIKE YOU HAVE ANY COVERAGE FOR MEALS AS WELL. INFORMED MEMBER THAT JUST LIKE THE TRANSPORTATION UH, THAT IS SOMETHING THAT I CAN LOOK INTO. INFORMED THE MEMBER THAT THERE MIGHT BE A SOCIAL SOCIAL SERVICE PROGRAM IN THEIR AREA THAT MIGHT DO THAT, SO ACTUALLY, LET ME GO AHEAD AND RESEARCH.
...
INFORMED MEMBER THAT THERE IS A WEBSITE CALLED ELDER CARE AND THE OFFER SORTS OF THINGS LIKE MEALS, TRANSPORTATION, ETC.

1210
INFORMED MEMBER THAT THEY DO NOT HAVE ANY BUILT IN TRANSPORTATION, AND I CAN GO AHEAD AND CHECK TO SEE IF THERE IS A SOCIAL SERVICE PROGRAM WE CAN USE ABOUT THAT. CONFIRMED THAT I HAVE THAT HERE IN FRONT OF ME AND IT DOES NOT LOOK LIKE YOU HAVE ANY COVERAGE FOR MEALS AS WELL. JUST LIKE THE TRANSPORTATION UH, THAT IS SOMETHING THAT I CAN LOOK INTO. THERE MIGHT BE A SOCIAL SOCIAL SERVICE PROGRAM IN THEIR AREA THAT MIGHT DO THAT, SO ACTUALLY, LET ME GO AHEAD AND RESEARCH.
...
CONFIRMED THAT THERE IS A WEBSITE CALLED ELDER CARE AND THE OFFER SORTS OF THINGS LIKE MEALS, TRANSPORTATION, ETC.

MACHINE-LEARNING BASED TRANSCRIPT SUMMARIZATION

CROSS-REFERENCE TO RELATED APPLICATIONS

This application claims the benefit of U.S. Provisional Application No. 63/366,797, entitled "AUTOMATIC CALL SUMMARIZATION," and filed Jun. 22, 2022, the entire contents of which are hereby incorporated by reference.

BACKGROUND

Various embodiments of the present invention address technical challenges related to performing abstractive and extractive summarization such as, for example, to automatically summarize a multi-party interaction transcript. Various embodiments of the present invention address the shortcomings of abstractive and extractive summarization systems and disclose various techniques for efficiently, reliably, and automatically summarizing a transcript without human intervention.

BRIEF SUMMARY

In general, embodiments of the present invention provide methods, apparatus, systems, computing devices, computing entities, and/or the like for automatically generating a summary of a multi-party interaction. Certain embodiments of the present invention utilize systems, methods, and computer program products that perform a combination of extractive and abstractive summarization techniques in a unique processing pipeline to generate a cohesive and comprehensive summary of a multi-party interaction.

In accordance with one aspect, a method for method for automatically generating a summary of a multi-party interaction using natural language processing is provided. In one embodiment, the method comprises: receiving a multi-party interaction transcript data object comprising a plurality of interaction utterances from at least two participants of the multi-party interaction transcript data object, wherein an interaction utterance comprises one or more sequential sentences associated with one of the at least two participants of the multi-party interaction transcript data object; identifying, using an extractive summarization model, a key sentence of the multi-party interaction transcript data object; identifying, from the multi-party interaction transcript data object, a particular interaction utterance of the plurality of interaction utterances that corresponds to the key sentence; generating a contextual summary for the multi-party interaction transcript data object based at least in part on the particular interaction utterance; and generating, using a machine-learning based speech converter model, a reported contextual summary based at least in part on the contextual summary, wherein the reported contextual summary comprises the contextual summary from a perspective of a particular participant.

In accordance with another aspect, an apparatus for automatically generating a summary of a multi-party interaction using natural language processing comprising at least one processor and at least one memory including computer program code is provided. In one embodiment, the at least one memory and the computer program code may be configured to, with the processor, cause the apparatus to: receive a multi-party interaction transcript data object comprising a plurality of interaction utterances from at least two participants of the multi-party interaction transcript data object, wherein an interaction utterance comprises one or more sentences continuously spoken by one of the at least two participants of the multi-party interaction transcript data object; generate, using an extractive summarization model, a key sentence of the multi-party interaction transcript data object; identify, from the multi-party interaction transcript data object, a particular interaction utterance of the plurality of interaction utterances that corresponds to the key sentence; generate a contextual summary for the multi-party interaction transcript data object based at least in part on the particular interaction utterance; and generate, using a machine-learning based speech converter model, a reported contextual summary based at least in part on the contextual summary, wherein the reported contextual summary comprises the contextual summary from a perspective a particular participant.

In accordance with yet another aspect, a computer program product for automatically generating a summary of a multi-party interaction using natural language processing is provided. The computer program product may comprise at least one computer-readable storage medium having computer-readable program code portions stored therein, the computer-readable program code portions comprising executable portions configured to: receive a multi-party interaction transcript data object comprising a plurality of interaction utterances from at least two participants of the multi-party interaction transcript data object, wherein an interaction utterance comprises one or more sentences continuously spoken by one of the at least two participants of the multi-party interaction transcript data object; generate, using an extractive summarization model, a key sentence of the multi-party interaction transcript data object; identify, from the multi-party interaction transcript data object, a particular interaction utterance of the plurality of interaction utterances that corresponds to the key sentence; generate a contextual summary for the multi-party interaction transcript data object based at least in part on the particular interaction utterance; and generate, using a machine-learning based speech converter model, a reported contextual summary based at least in part on the contextual summary, wherein the reported contextual summary comprises the contextual summary from a perspective a particular participant.

BRIEF DESCRIPTION OF THE DRAWINGS

Figure 1:
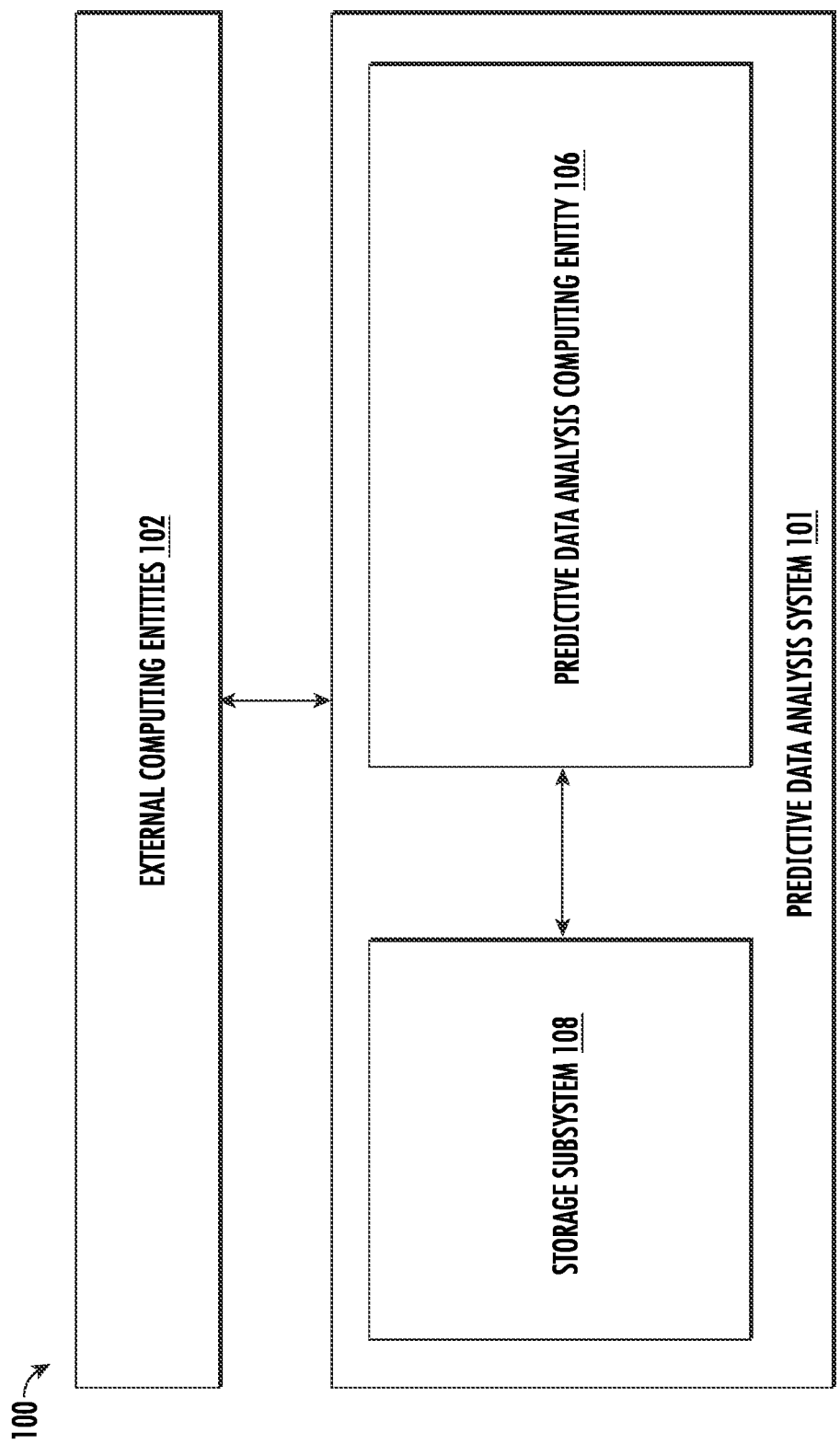

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
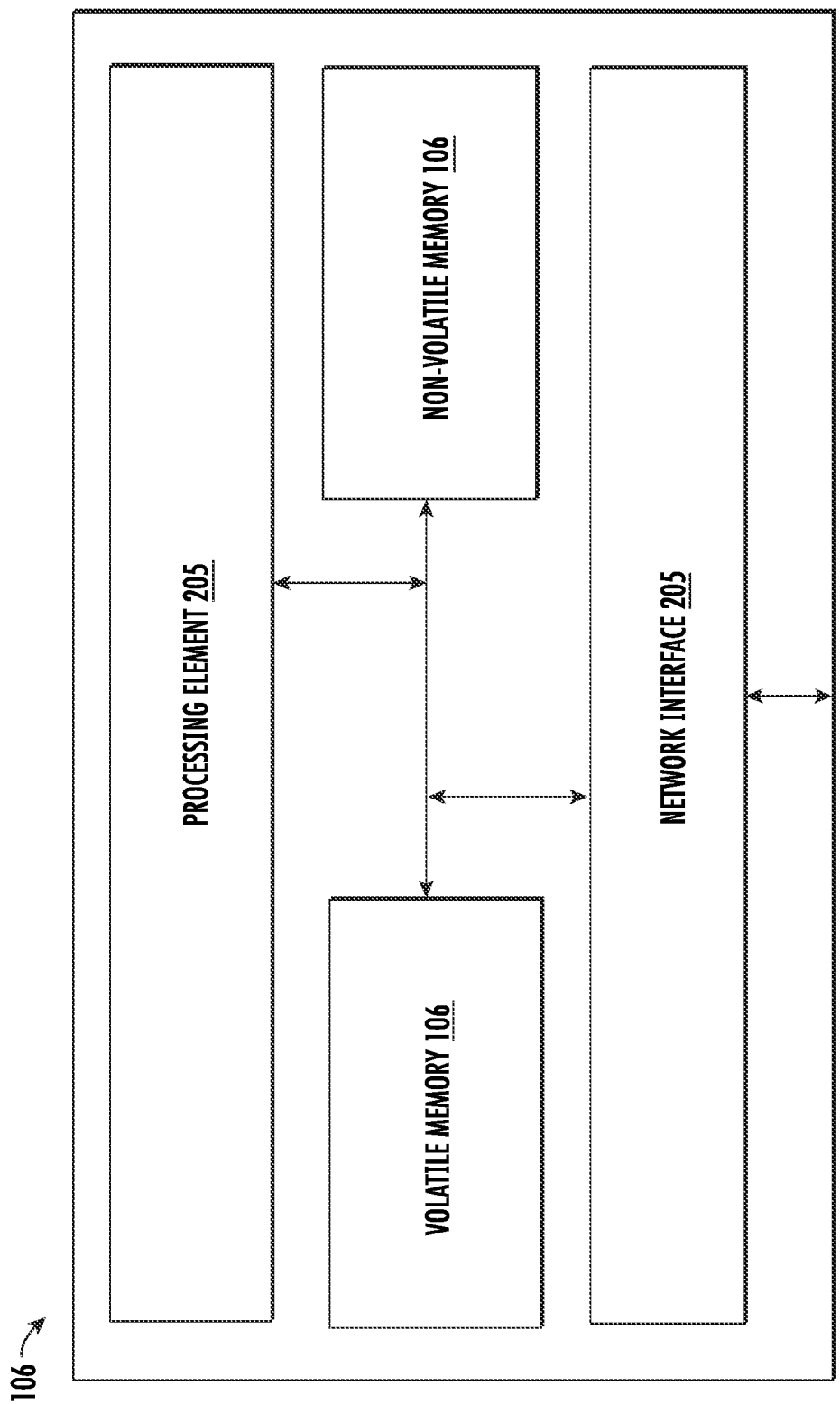

FIG. 2 provides an example predictive data analysis computing entity in accordance with some embodiments discussed herein.

Figure 3:
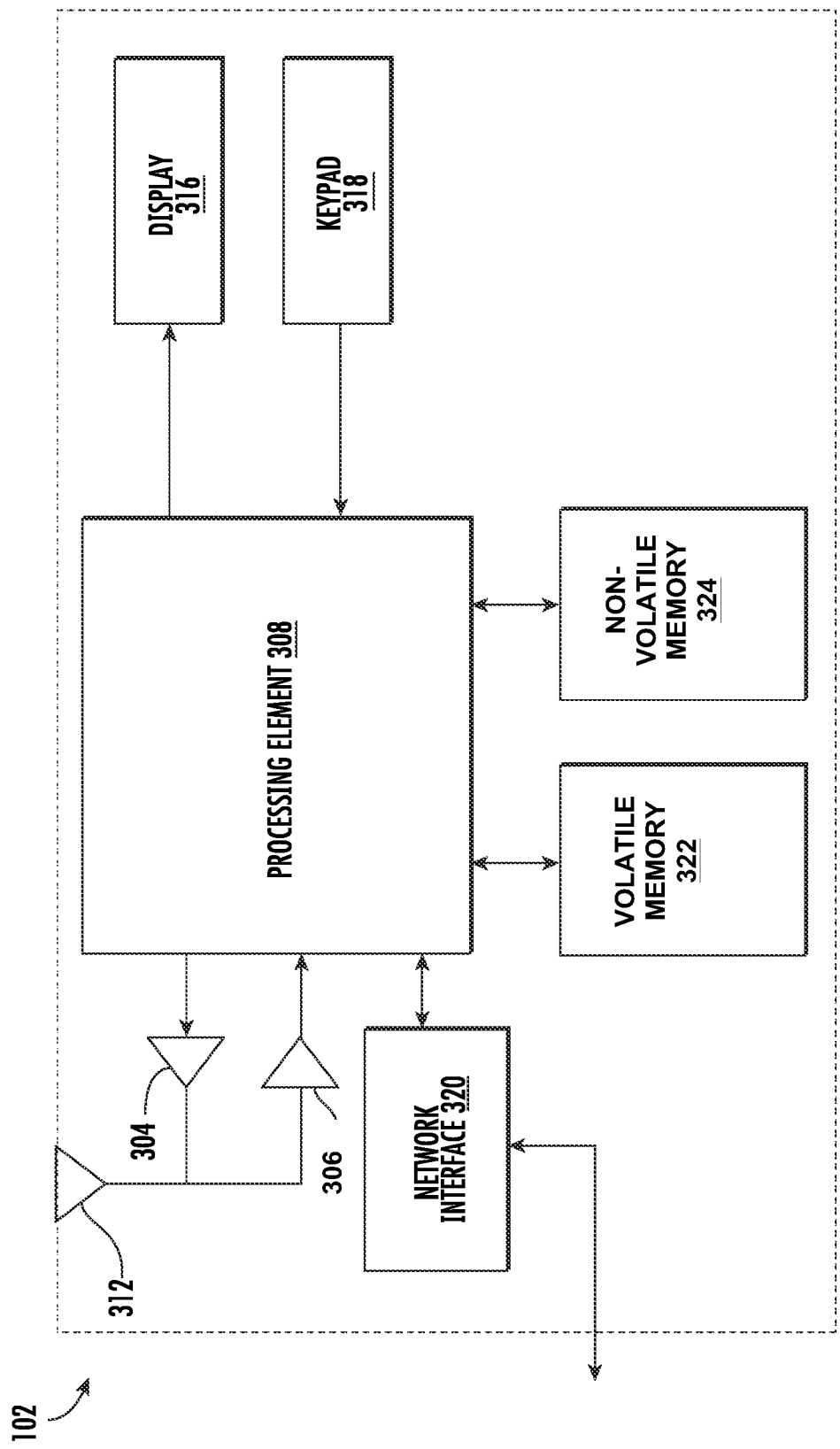

FIG. 3 provides an example external computing entity in accordance with some embodiments discussed herein.

Figure 4:
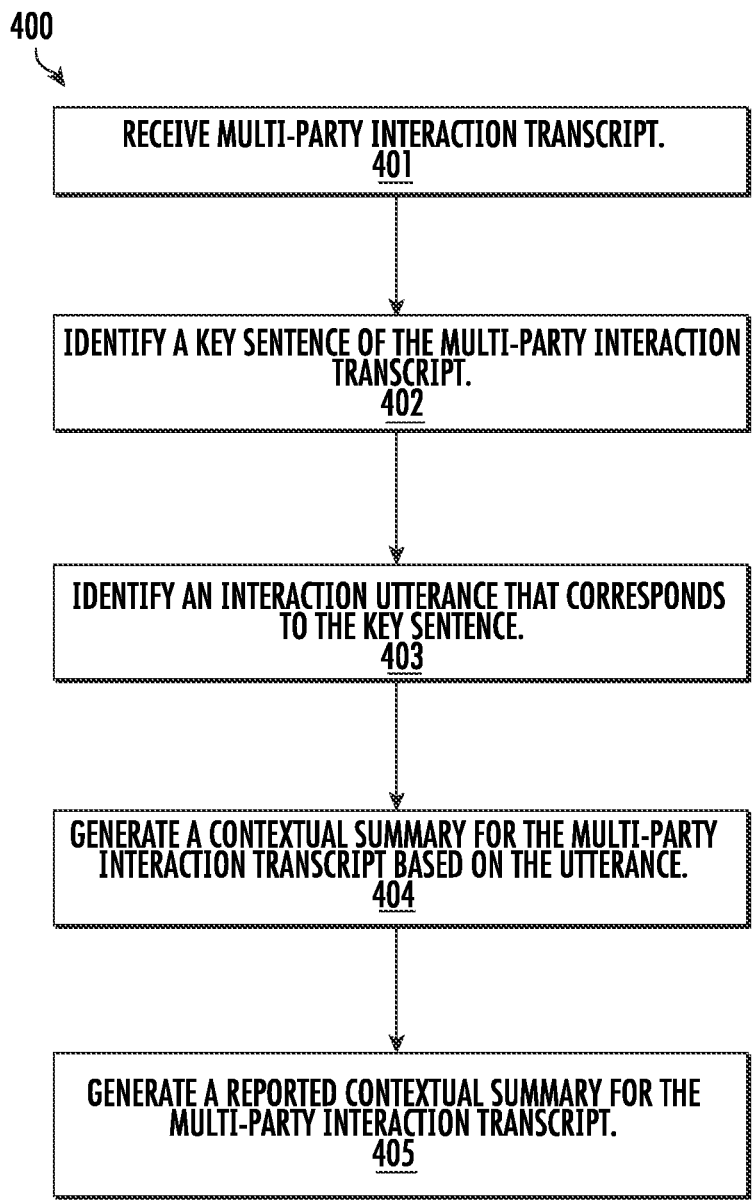

FIG. 4 is a flowchart diagram of an example process for generating a contextual summary of a multi-party interaction in accordance with some embodiments discussed herein.

Figure 5:
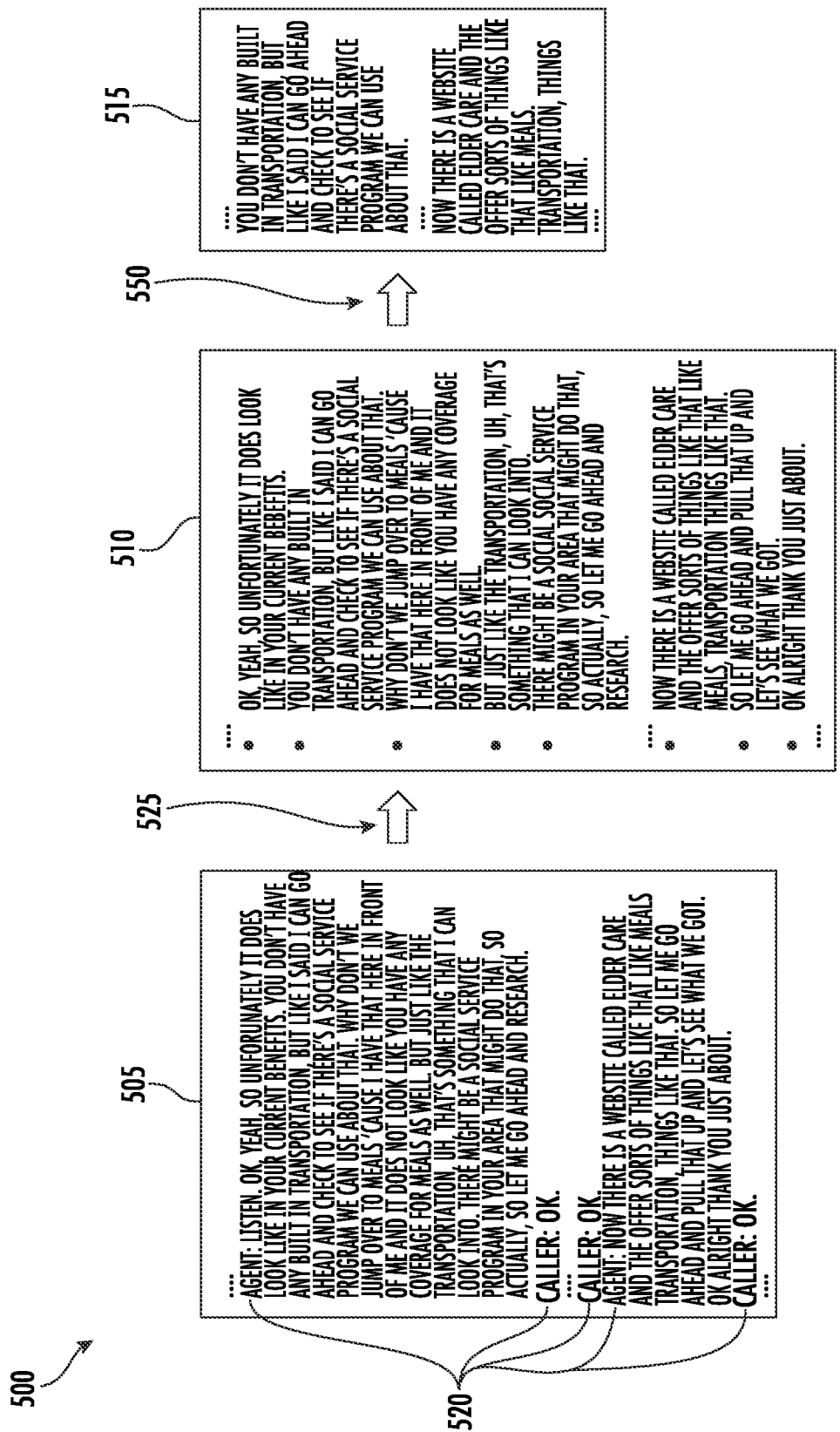

FIG. 5 provides an operational example of a key sentence extraction process in accordance with some embodiments discussed herein.

FIG. 6 provides an operational example of an utterance mapping process in accordance with some embodiments discussed herein.

Figure 7:
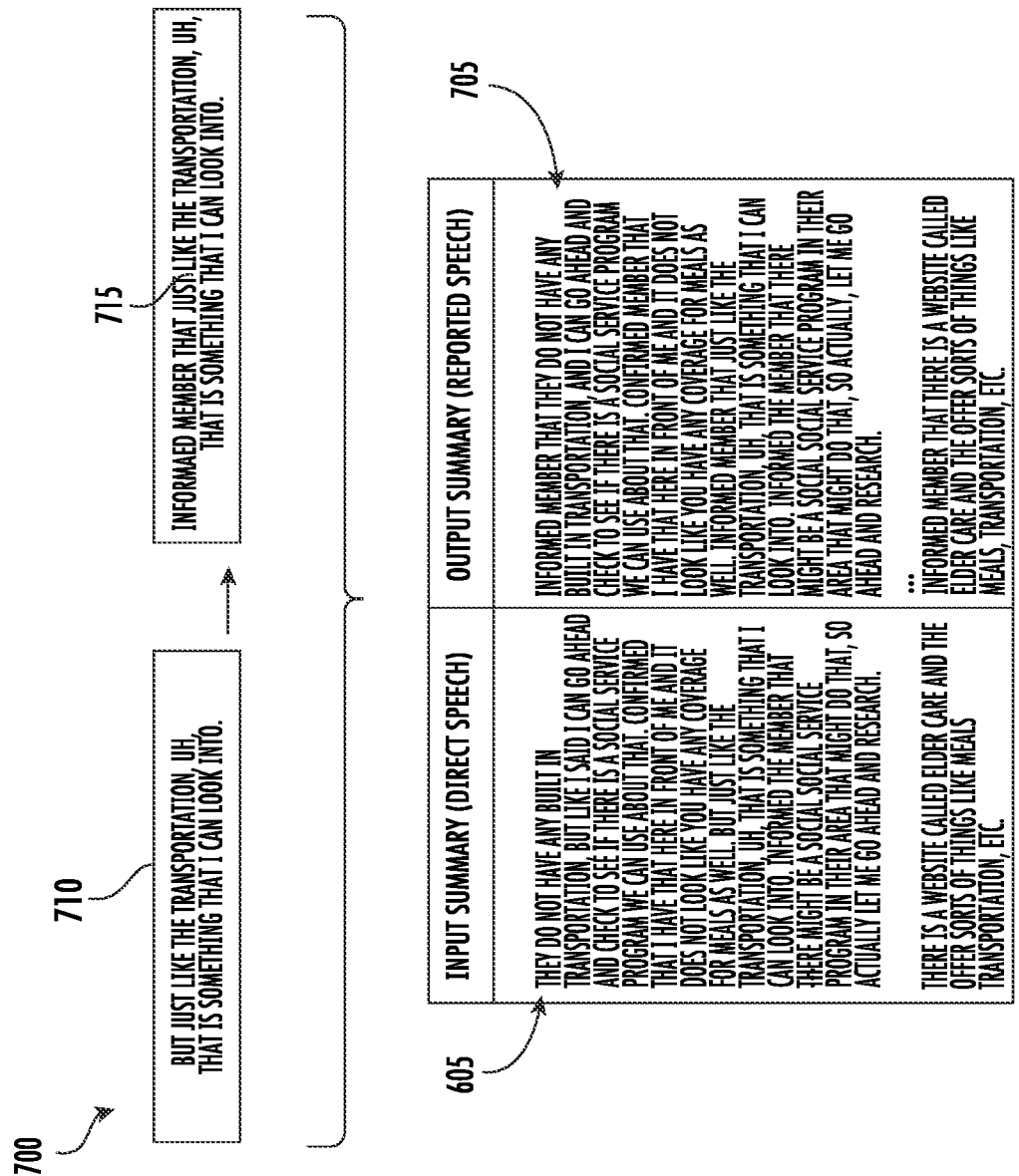

FIG. 7 provides an operational example of a speech converter process in accordance with some embodiments discussed herein.

Figure 8:
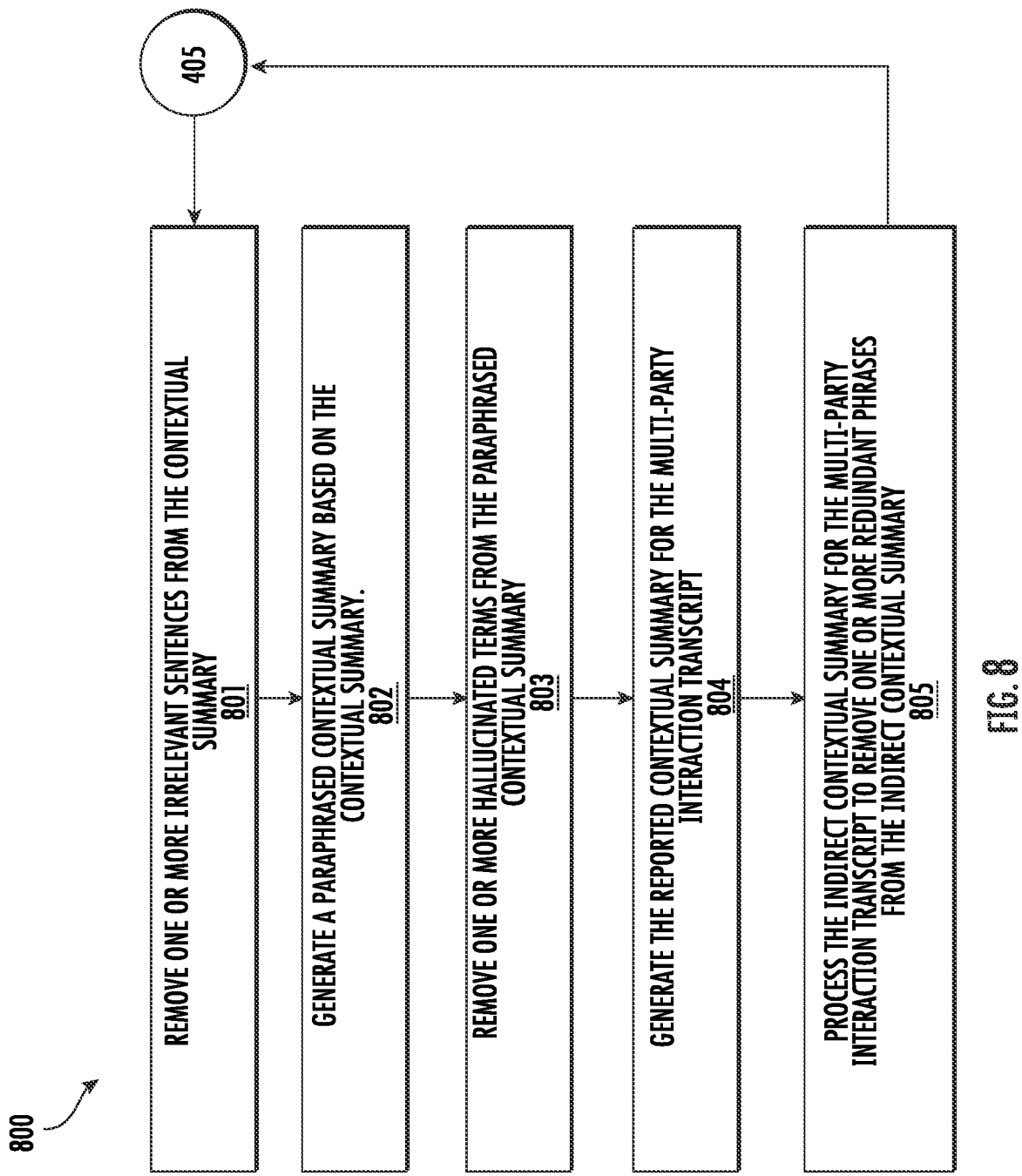

FIG. 8 is a flowchart diagram of an example process for refining a contextual summary of a multi-party interaction in accordance with some embodiments discussed herein.

Figure 9:
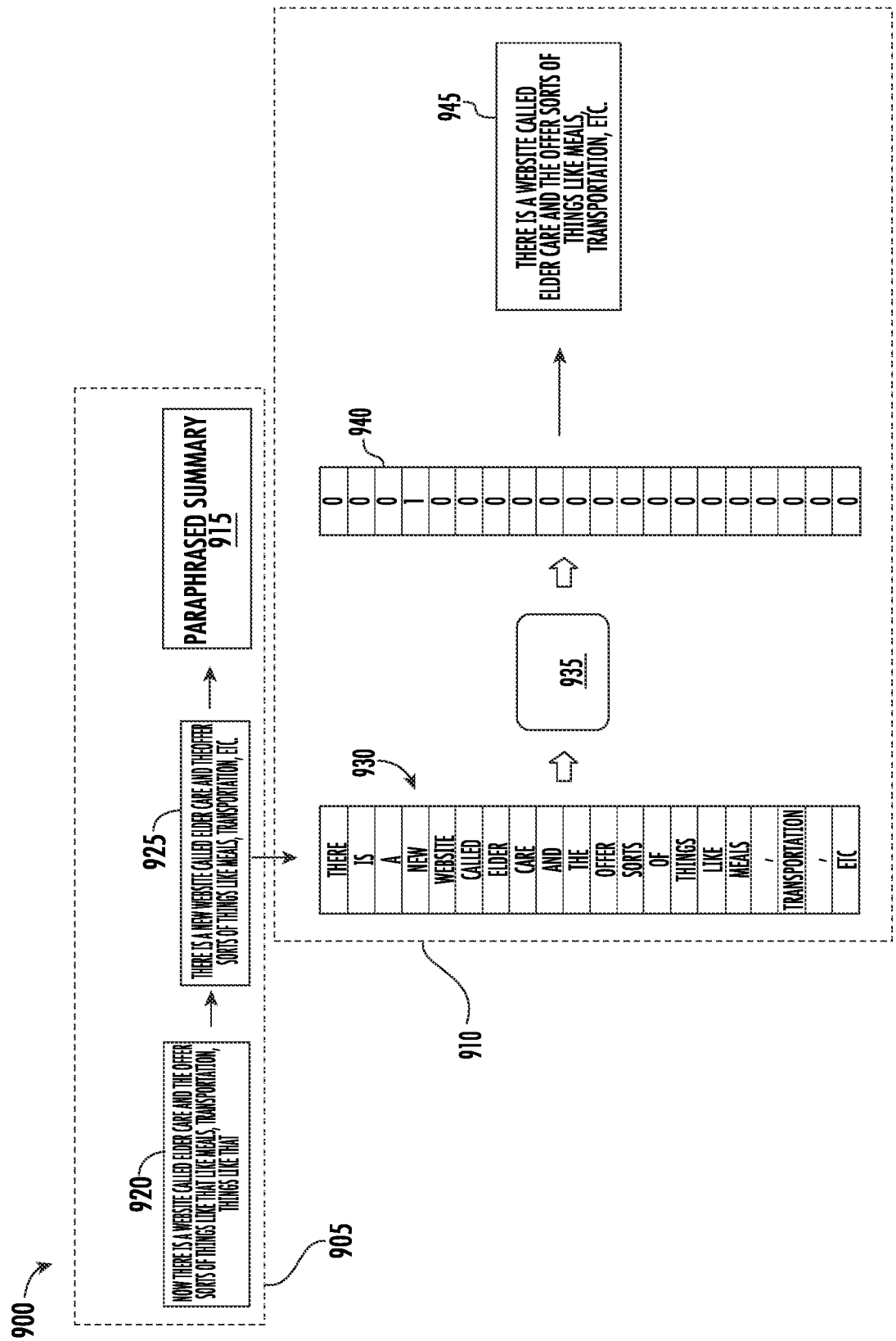

FIG. 9 provides an operational example of a paraphrasing process in accordance with some embodiments discussed herein.

Figure 10:
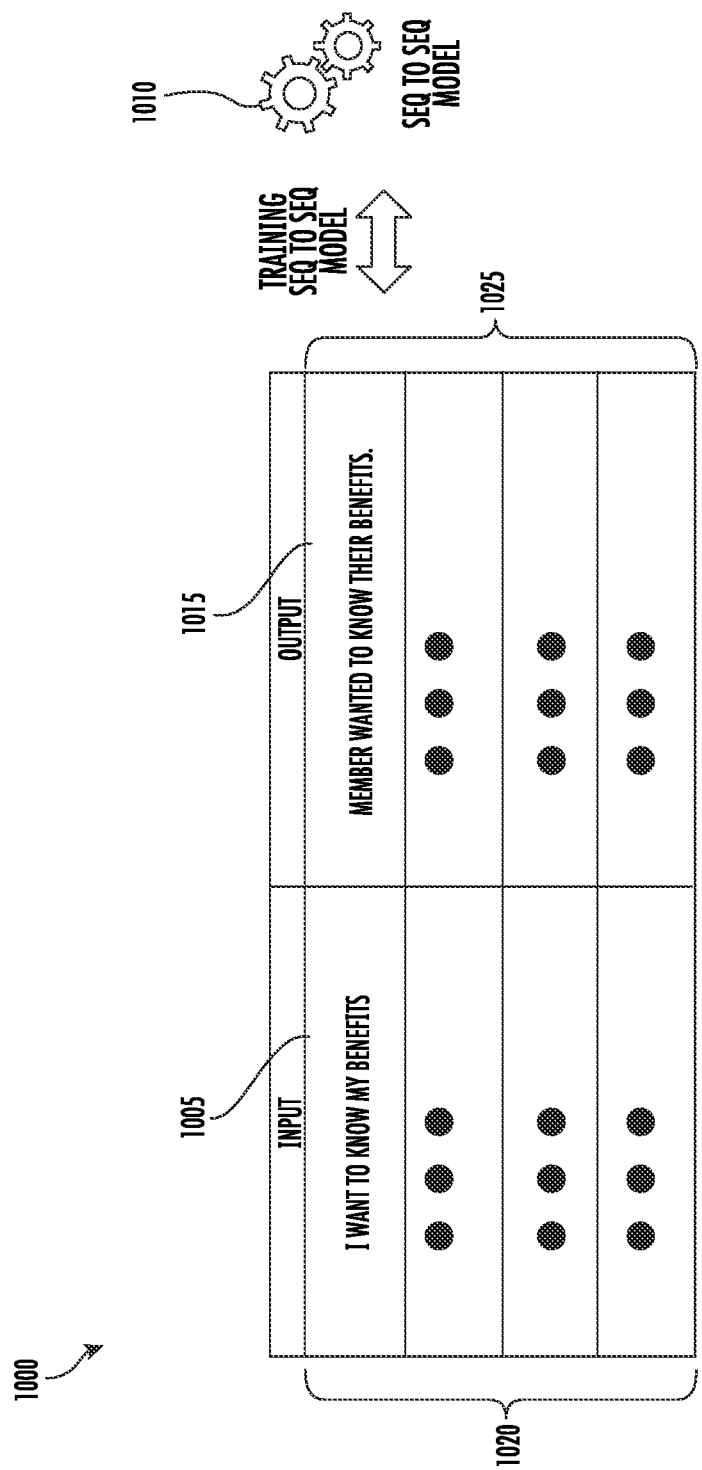

FIG. 10 provides an operational example of a speech converter process using the machine-learning based speech converter model in accordance with some embodiments discussed herein.

Figure 11:
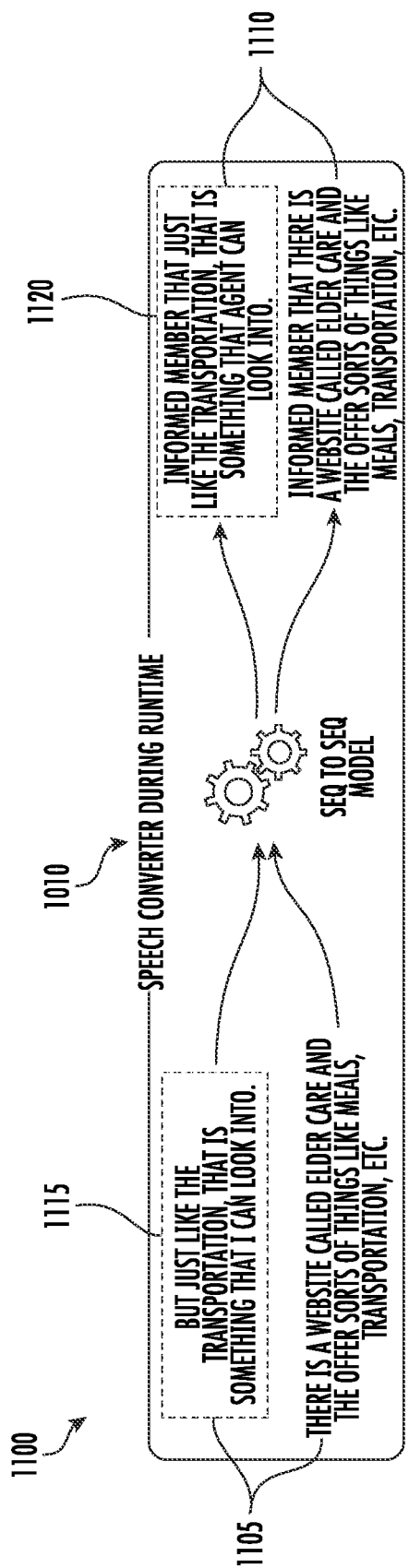

FIG. 11 provides an operational example of a training process for the machine-learning based speech converter model in accordance with some embodiments discussed herein.

FIG. 12 provides an operational example of a reported contextual summary in accordance with some embodiments discussed herein.

Figure 13:
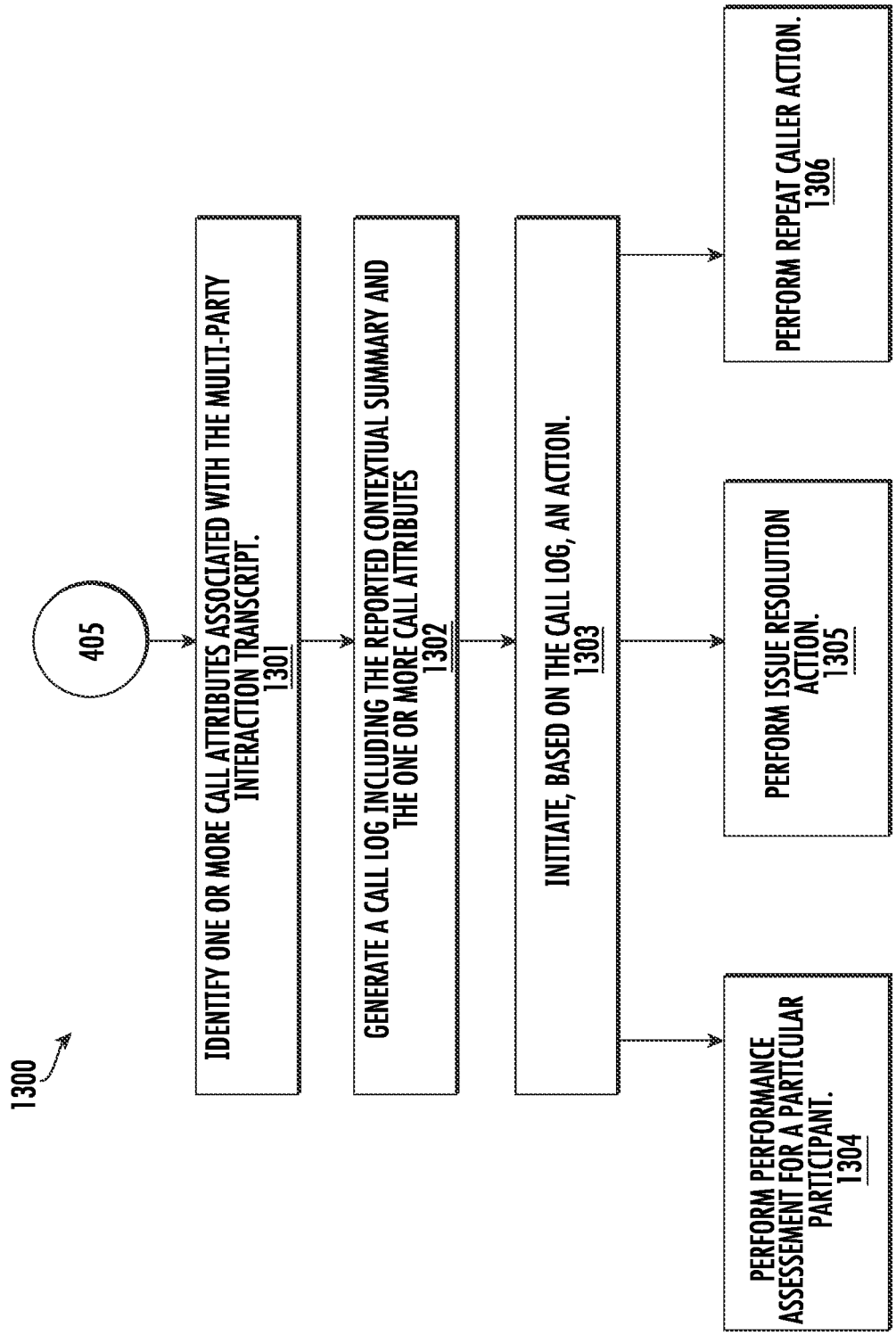

FIG. 13 is a flowchart diagram of an example process for initiating an action based at least in part on a reported contextual summary in accordance with some embodiments discussed herein.

DETAILED DESCRIPTION

Various embodiments of the present invention now will be described more fully herein with reference to the accompanying drawings, in which some, but not all, embodiments of the inventions are shown. Indeed, these inventions can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to textual data analysis, one of ordinary skill in the art will recognize that the disclosed concepts can be used to perform other types of data analysis.

I. OVERVIEW

Aspects of the present invention present an automatic summarization method for generating contextual summaries from multi-party transcript data. The automatic summarization method combines extractive and abstractive summarization techniques in a unique processing pipeline that generates a cohesive and comprehensive summary of a multi-party interaction. The methods and systems of the present disclosure utilize a plurality of new machine-learning models that can independently or collaboratively be applied to a multi-party interaction to generate a contextual summary for the multi-party interaction that captures important points discussed during the multi-party interaction such as, for example, a first participant's intent behind the multi-party interaction and/or another participant's resolution for the first participant. This information can be leveraged to improve computer reasoning of multi-party interactions and enhance computer recall and storage capabilities for the multi-party interactions.

According to some aspects of the present invention, a multi-party interaction transcript representative of a multi-party interaction is processed using an extractive summarization model to identify a key sentence of the multi-party interaction transcript data object. An interaction utterance from the multi-party interaction transcript data object is identified based at least in part on the key sentence. The interaction utterance is used to generate a contextual summary for the multi-party interaction transcript data object that includes the key sentence with additional context for the key sentence. In this manner, the present invention provides a practical improvement over traditional extractive summarization models by capturing additional context that can be missed by a sentence-level extractive summarizer.

According to some aspects of the present invention, the contextual summary can be further refined by one or more additional machine-learning based models to generate a reported contextual summary for the multi-party interaction transcript data object. For example, the contextual summary can be processed by a machine-learning based irrelevant classifier model to remove one or more irrelevant sentences from the contextual summary. This enables the generation of contextual summaries with additional information that is related to important points of the multi-party interaction transcript data object and can improve computer performance in several computing applications such as, for example, computer intent prediction, classification algorithms, etc.

As another example, the contextual summary can be processed by an abstractive summarization model to generate a coherent paraphrased contextual summary. To improve upon prior abstractive summarization techniques, each sentence of the contextual summary can be processed individually to reduce the incorporation of hallucinated content that can impact the meaning of the contextual summary. In some embodiments, the paraphrased contextual summary can be further process by a machine-learning based hallucinated content model previously trained to identify the hallucinated content of the paraphrased contextual summary. In this manner, the present invention provides a solution to the technical problem of detrimental hallucinated content added by abstractive summarization models.

As yet another example, the contextual summary can be processed by another machine-learning based model to generate a reported contextual summary from the perspective of one participant of the multi-party interaction transcript data object. The reported contextual summary can be further processed, in some embodiments, to remove one or more redundant phrases. The resulting reported contextual summary can include all important aspects of the multi-party interaction transcript data object, while retaining abstractive benefits such as, for example, sentence smoothing, etc. that can be provided by abstractive summarization techniques.

Exemplary inventive and technologically advantageous aspects of the present invention include: (i) techniques for capturing additional context along with key summary sentences; (ii) techniques for preparing data automatically for unnecessary sentence classification; (iii) techniques for preparing data automatically for summary paraphrasing; and (iv) techniques for converting sentences from direct to indirect speech. The present invention provides a new text processing pipeline that combines advantages of extractive and abstractive summarization techniques, while overcoming disadvantages thereof. For instance, the present invention can overcome the disadvantages of incoherency, redundancy, and lack of context that can be prevalent in conventional extractive summarization techniques, while providing for the accuracy offered by such techniques. In addition, the present invention can overcome the disadvantages of hallucinated content and factual inconsistencies that can be prevalent in conventional abstractive summarization techniques, while providing for improved coherency, conciseness, and less redundancy offered by such techniques.

II. DEFINITIONS

The term "multi-party interaction transcript" can refer to a data entity that is configured to describe a temporal flow of verbal interactions between at least two interaction participants. An example of a multi-party interaction transcript is a call transcript between at least two participants of a call, such as a call transcript for a call between a customer service agent and a customer. In the noted example, the call transcript can describe verbal interactions by the participants in a temporally sequential manner, where each verbal interaction by a participant can include one or more utterances (e.g., each including one or more sentences). For example, with respect to the call transcript for a call between a customer service agent and a customer, the call transcript can describe that a first utterance by the customer service agent (e.g., "Hello, how is your day today. How can I help you?") is temporally followed by a second utterance by the customer (e.g., "Thank you. I'm doing well. I am trying to check my account balance."), which can then be temporally followed by a third utterance by the customer service agent, and so on. Other examples of multi-party interaction transcripts include meeting transcripts, conference call transcripts, auction transcripts, chat-bot transcripts, and/or the like. A multi-party interaction transcript data object can include at least a portion of the multi-party interaction transcript.

The term "interaction utterance" can refer to a data entity that is configured to describe a semantically coherent unit of words that is recorded by the multi-party interaction transcript data object. An example of an interaction utterance is one or more sequential sentences attributed to one of the at least two participants of the multi-party interaction transcript data object. In some embodiments, to detect interaction utterances in a multi-party interaction transcript, a predictive data analysis computing entity utilizes one or more speech fragmentation algorithms, such as one or more sentence detection algorithms. Each interaction utterance in a multi-party interaction transcript is typically associated with an interaction participant of the plurality of interaction participants that are in turn associated with the multi-party interaction transcript data object. Accordingly, in some embodiments, the interaction utterances in a multi-party interaction transcript can be divided into two or more subsets, where each subset includes the set of interaction utterances in a multi-party interaction transcript that is associated with a particular interaction participant of the two or more interaction participants.

The term "interaction participant" can refer to a human or computer entity that takes part in a multi-party interaction. For example, an interaction participant can include a customer service agent and a customer that take part in a customer service call. As another example, an interaction participant can include an automated customer service robot and a customer that take part in a customer service text exchange. For instance, the automated customer service robot can be configured to analyze interaction utterances by the customer, determine an automated response based at least in part on the interaction utterances, and provide the automated response to the customer.

III. COMPUTER PROGRAM PRODUCTS, METHODS, AND COMPUTING ENTITIES

Embodiments of the present invention can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RI IM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present invention can also be implemented as methods, apparatus, systems, computing devices, computing entities, and/or the like. As such, embodiments of the present invention can take the form of an apparatus, system, computing device, computing entity, and/or the like executing instructions stored on a computer-readable storage medium to perform certain steps or operations. Thus, embodiments of the present invention can also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about summarization of a natural language document, such as summarization of a transcript (e.g., summarization of a multi-party interaction transcript, such as a two-party call transcript).

In some embodiments, predictive data analysis system 101 can communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 can include a predictive data analysis computing entity 106 and a storage subsystem 108. The predictive data analysis computing entity 106 can be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 can be configured to store input data used by the predictive data analysis computing entity 106 to perform predictive data analysis as well as model definition data used by the predictive data analysis computing entity 106 to perform various predictive data analysis tasks. The storage subsystem 108 can include one or more storage units, such as multiple distributed storage units that are connected through a computer network. Each storage unit in the storage subsystem 108 can store at least one of one or more data assets and/or one or more data about the computed properties of one or more data assets. Moreover, each storage unit in the storage subsystem 108 can include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 can also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 can include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 can be embodied in a number of different ways.

For example, the processing element 205 can be embodied as one or more complex programmable logic devices (CPLDs), microprocessors, multi-core processors, coprocessing entities, application-specific instruction-set processors (ASIPs), microcontrollers, and/or controllers. Further, the processing element 205 can be embodied as one or more other processing devices or circuitry. The term circuitry can refer to an entirely hardware embodiment or a combination of hardware and computer program products. Thus, the processing element 205 can be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 can be configured for a particular use or configured to execute instructions stored in volatile or non-volatile media or otherwise accessible to the processing element 205. As such, whether configured by hardware or computer program products, or by a combination thereof, the processing element 205 can be capable of performing steps or operations according to embodiments of the present invention when configured accordingly.

In one embodiment, the predictive data analysis computing entity 106 can further include, or be in communication with, non-volatile media (also referred to as non-volatile storage, memory, memory storage, memory circuitry and/or similar terms used herein interchangeably). In one embodiment, the non-volatile storage or memory can include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 can further include, or be in communication with, volatile media (also referred to as volatile storage memory, memory storage, memory circuitry and/or similar terms used herein interchangeably). In one embodiment, the volatile storage or memory can also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like can be used to control certain aspects of the operation of the predictive data analysis computing entity 106 with the assistance of the processing element 205 and operating system.

As indicated, in one embodiment, the predictive data analysis computing entity 106 can also include one or more communications interfaces 220 for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 can include, or be in communication with, one or more input elements, such as a keyboard input, a mouse input, a touch screen/display input, motion input, movement input, audio input, pointing device input, joystick input, keypad input, and/or the like. The predictive data analysis computing entity 106 can also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, can include signaling information/data in accordance with air interface standards of applicable wireless systems. In this regard, the external computing entity 102 can be capable of operating with one or more air interface standards, communication protocols, modulation types, and access types. More particularly, the external computing entity 102 can operate in accordance with any of a number of wireless communication standards and protocols, such as those described above with regard to the predictive data analysis computing entity 106. In a particular embodiment, the external computing entity 102 can operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 can operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 can include location determining aspects, devices, modules, functionalities, and/or similar words used herein interchangeably. For example, the external computing entity 102 can include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites can be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

Alternatively, the location information/data can be determined by triangulating the external computing entity's 102 position in connection with a variety of other systems, including cellular towers, Wi-Fi access points, and/or the like. Similarly, the external computing entity 102 can include indoor positioning aspects, such as a location module adapted to acquire, for example, latitude, longitude, altitude, geocode, course, direction, heading, speed, time, date, and/or various other information/data. Some of the indoor systems can use various position or location technologies including RFID tags, indoor beacons or transmitters, Wi-Fi access points, cellular towers, nearby computing devices (e.g., smartphones, laptops) and/or the like. For instance, such technologies can include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 can also comprise a user interface (that can include a display 316 coupled to a processing element 308) and/or a user input interface (coupled to a processing element 308). For example, the user interface can be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and can include a full set of alphabetic keys or set of keys that can be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or can be removable. For example, the non-volatile memory can be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The volatile memory can be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and nonvolatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this can include a user application that is resident on the entity or accessible through a browser or other user interface for communicating with the predictive data analysis computing entity 106 and/or various other computing entities.

In another embodiment, the external computing entity 102 can include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 can be embodied as an artificial intelligence (AI) computing entity, such as an Amazon Echo, Amazon Echo Dot, Amazon Show, Google Home, and/or the like. Accordingly, the external computing entity 102 can be configured to provide and/or receive information/data from a user via an input/output mechanism, such as a display, a camera, a speaker, a voice-activated input, and/or the like. In certain embodiments, an AI computing entity can comprise one or more predefined and executable program algorithms stored within an onboard memory storage module, and/or accessible over a network. In various embodiments, the AI computing entity can be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for generating a contextual summary of a multi-party interaction. Via the various steps/operations of the process 400, the predictive data analysis computing entity 106 can generate transcript summaries with contextual information in an efficient and reliable manner.

At step/operation 401, the process 400 can include receiving a multi-party interaction transcript. For example, the predictive data analysis computing entity 106 can receive the multi-party interaction transcript data object. The multi-party interaction transcript data object can describe a temporal flow of verbal interactions between two or more interaction participants. An example of a multi-party interaction transcript is a call transcript between at least two participants of a call, such as a call transcript for a call between a customer service agent and a customer. In the noted example, the call transcript can describe verbal interactions by the participants in a temporally sequential manner, where each verbal interaction by a participant can include one or more utterances (e.g., each including one or more sentences).

For example, with respect to the call transcript for a call between a customer service agent and a customer, the call transcript can describe that a first utterance by the customer service agent (e.g., "Hello, how is your day today. How can I help you?") is temporally followed by a second utterance by the customer (e.g., "Thank you. I'm doing well. I am trying to check my account balance."), which can then be temporally followed by a third utterance by the customer service agent, and so on. Other examples of multi-party interaction transcripts include meeting transcripts, conference call transcripts, auction transcripts, chat-bot transcripts, and/or the like.

The multi-party interaction can be a spoken interaction (e.g., a phone call, etc.) or a textual interaction. The predictive data analysis computing entity 106 can receive the multi-party interaction transcript data object from at least one participant to the textual interaction or record the multi-party interaction transcript data object during the textual interaction. In addition, or alternatively, the predictive data analysis computing entity 106 can receive audio data for a spoken interaction and leverage speech to text functionalities to generate the multi-party interaction transcript data object.

The multi-party interaction transcript data object can be associated with two or more interaction participants, where each interaction participant describes a verbal participant in the multi-party interaction that is associated with the multi-party interaction transcript data object. While various embodiments of the present invention are described with reference to two-party interaction transcripts and/or with reference to call transcripts, a person of ordinary skill in the relevant technology will recognize that the disclosed techniques can be utilize to generate contextual summaries of interaction transcripts associated with any number of interaction participants as well as to generate contextual summaries of interaction transcripts associated with any type of multi-party interaction events, such as to generate contextual summaries of meeting transcripts, conference call transcripts, auction transcripts, and/or the like.

The multi-party interaction transcript data object can include a plurality of interaction utterances from the at least two participants of the multi-party interaction transcript data object. Each interaction utterance can include one or more sequential sentences associated with one of the at least two participants of the multi-party interaction transcript data object. An interaction utterance, for example, can include any semantically coherent unit of words that is recorded by the multi-party interaction transcript data object.

In some embodiments, to detect interaction utterances in a multi-party interaction transcript, the predictive data analysis computing entity 106 can utilize one or more speech fragmentation algorithms, such as one or more sentence detection algorithms. Each interaction utterance in a multi-party interaction transcript can be associated with a respective interaction participant of the multi-party interaction transcript data object. In some embodiments, the interaction utterances in a multi-party interaction transcript can be divided into two or more subsets, where each subset includes the set of interaction utterances in a multi-party interaction transcript that is associated with a particular interaction participant of the two or more interaction participants.

At step/operation 402, the process can include identifying a key sentence of the multi-party interaction transcript object. For example, the predictive data analysis computing entity 106 can identify a plurality of key sentences of the multi-party interaction transcript object.

A key sentence can be indicative of at least one of: (i) an intention of a respective participant of the at least two participants; or (2) a resolution for the respective participant. For example, the plurality of key sentences can include one or more participant intent sentences and/or one or more participant resolution sentences. The one or more participant intent sentences can be representative of an intention of a respective participant of the at least two participants. The one or more participant resolution sentences can be representative of a resolution for the respective participant.

For instance, in a multi-party interaction between (i) a calling participant such as, for example, a customer or member of an organization and (ii) a receiving participant such as, for example, an agent of the organization, the one or more participant intent sentences can include one or more caller intent sentences representative of the calling participant's detailed reason (or reasons) for calling the agent of the organization. In the same scenario, the one or more participant resolution sentences can include one or more agent resolution sentences representative of the resolution offered by the receiving participant for the caller's concerns. As described herein, the contextual summary can be used to capture these important aspects of the multi-party interaction to improve interaction recall and participant issue tracking.

The participant intent sentences and the participant resolution sentences can be provided by any participant of the multi-party interaction. In some embodiments, a multi-party interaction can include a plurality of intentions and a plurality of resolutions. The participant intent sentences can include at least one sentence for each of the plurality of intentions. The participant resolution sentences can include at least one sentence for each of the plurality of resolutions. In some embodiments, the participant intent sentences can include one or more sentences attributed to a calling participant. In some embodiments, the participant resolution sentences can include one or more sentences attributed to a receiving participant.

In some embodiments, the predictive data analysis computing entity 106 can process the multi-party interaction transcript data object using an extractive summarization model to identify the plurality of key sentences. The extractive summarization model can include a machine-learning based model such as, for example, one or more supervised, unsupervised, and/or reinforcement learning models. In some implementations, the machine-learning based model can include one or more neural networks (e.g., feedforward artificial neural networks, perceptron and multilayer perceptron neural networks, radial basis function artificial neural networks, recurrent neural networks, modular neural networks, etc.), transformer models, and/or any other extractive natural language processing model. Exemplary techniques for processing the multi-party interaction transcript data object to identify key sentences of the multi-party interaction transcript data object are described in U.S. patent application Ser. No. 17/122,607 entitled "Natural language processing for optimized extractive summarization." However, any other extractive summarization technique can also be used.

FIG. 5 provides an operational example of a key sentence extraction process 500 in accordance with some embodiments discussed herein. The key sentence extraction process 500 can include one or more stages. For instance, the key sentence extraction process 500 can include an initial sentence identification stage 525 and/or a sentence extraction stage 550.

During the initial sentence identification state 525, the predictive data analysis computing entity 106 can identify individual sentences 510 from the multi-party interaction transcript data object 505. The multi-party interaction transcript data object 505 can be associated with a plurality of interaction utterances 520 listed in a temporally sequential order. Each interaction utterance 520 can include one or multiple sentences provided (e.g., spoken, written, typed, etc.) by a participant of the multi-party interaction transcript data object 505. The predictive data analysis computing entity 106 can identify the individual sentences 510 for the multi-party interaction transcript data object 505 from the plurality of interaction utterances 520.

During the sentence extraction stage 550, the predictive data analysis computing entity 106 can process the individual sentences 510 to identify the key sentences 515. For example, the predictive data analysis computing entity 106 can apply the extractive summarization model to each of the individual sentences 510 of the multi-party interaction transcript data object 505 to identify the key sentences 515.

Returning to FIG. 4, at step/operation 403, the process can include identifying an interaction utterance that corresponds to the key sentence of the multi-party interaction transcript data object. For example, the predictive data analysis computing entity 106 can identify the interaction utterance that corresponds to the key sentence. To do so, the predictive data analysis computing entity 106 can identify one or more interaction utterances from the multi-party interaction transcript data object that included the extracted key sentences.

FIG. 6 provides an operational example of an utterance mapping process 600 in accordance with some embodiments discussed herein. The utterance mapping process 600 can include one or more stages. For instance, the utterance mapping process 600 can include an initial mapping stage 625 and/or a contextual extraction stage 650.

During the initial mapping stage 625, the predictive data analysis computing entity 106 can identify one or more utterances from the multi-party interaction transcript data object 505 that correspond to the key sentences 515. For instance, the predictive data analysis computing entity 106 can use one more string-matching algorithms to map the key sentences 515 to one or more interaction utterances of the multi-party interaction transcript data object. The one or more interaction utterances, for example, can include the interaction utterances from which the key sentences 515 were extracted.

During the contextual extraction stage 650, the predictive data analysis computing entity 106 can extract the one or more interaction utterances from the multi-party interaction transcript data object 505 to generate the contextual summary 605. The contextual summary 605 can include the each of the full interaction utterances that contained the key sentences 515 to provide additional context related to the key sentences 515. In this manner, the contextual summary 605 can provide additional context to the one or more of the key sentences 515 by including sentences adjacent (e.g., preceding, succeeding, etc.) the key sentences 515 in a respective utterance of the multi-party interaction transcript data object 505.

In some embodiments, the contextual summary 605 can include one or more sub-contextual summaries. The sub-contextual summaries can include a summary for each key sentence, each participant, and/or each distinct intention and/or resolution identified for the multi-party interaction transcript data object 505. By way of example, the sub-contextual summaries can include a first, participant intent summary 610 representative of a respective participant's intent for the multi-party interaction transcript data object 505. In addition, or alternatively, the sub-contextual summaries can include a second, participant resolution summary 615 representative of a resolution for a respective participant of the multi-party interaction transcript data object 505.

Returning to FIG. 4, at step/operation 404, the process 400 can include generating a contextual summary for the multi-party interaction transcript data object based at least in part on the interaction utterance. For example, as described herein, the predictive data analysis computing entity 106 can generate the contextual summary for the multi-party interaction transcript data object based at least in part on the one or more interaction utterances identified as corresponding to each of the key sentences. The contextual summary, for example, can include at least one contextual summary including one or more utterances from the multi-party interaction transcript data object that correspond to caller intent key sentences (e.g., a caller intent summary). In addition, or alternatively, the contextual summary can include at least one contextual summary comprising one or more utterances from the multi-party interaction transcript data object that correspond to the caller resolution key sentences (e.g., a caller resolution summary).

At step/operation 405, the process 400 can include generating a reported contextual summary for the multi-party interaction transcript data object. For example, the predictive data analysis computing entity 106 can generate the reported contextual summary for the multi-party interaction transcript data object using a machine-learning based speech converter model. By way of example, the predictive data analysis computing entity 106 can process the contextual summary using the machine-learning based speech converter model to generate the reported contextual summary for the multi-party interaction transcript data object. The reported contextual summary can include the contextual summary from a perspective a particular participant such as, for example, the receiving participant (e.g., a customer service agent, a chat robot, etc.).

FIG. 7 provides an operational example of a speech converter process 700 in accordance with some embodiments discussed herein. During the speech converter process 700, the predictive data analysis computing entity 106 can process the contextual summary 605 using the machine-learning based speech converter model to generate a reported contextual summary 705. The reported contextual summary 705 can include a translation of the contextual summary 605 from a direct perspective of each participant of the multi-party interaction to an indirect, reporting perspective of a particular participant.

In some embodiments, the machine-learning based speech converter model can individually process each contextual summary sentence 710 of the contextual summary 605. For example. predictive data analysis computing entity 106 can identify a respective contextual summary sentence 710 from the contextual summary 605. The predictive data analysis computing entity 106 can input the contextual summary sentence 710 to the machine-learning based speech converter model to receive a reported contextual sentence 715 as an output of the machine-learning based speech converter model. The predictive data analysis computing entity 106 can repeat this process for each sentence of the contextual summary 605 to receive the reported contextual summary 705.

FIG. 8 is a flowchart diagram of an example process 800 for refining a contextual summary of a multi-party interaction transcript. Via the various steps/operations of the process 800, the predictive data analysis computing entity 106 can generate transcript summaries with contextual information in an efficient and reliable manner. In some embodiments, the process 800 can include a plurality of operations subsequent to operation 405 of FIG. 4, where the process 400 includes processing the contextual summary to generate the reported contextual summary for the multi-party interaction transcript data object. In addition, or alternatively, the process 800 can include one or more suboperations of operation 405 of FIG. 4.

At step/operation 801, the process 800 can include to removing one or more irrelevant sentences from the contextual summary. For example, the predictive data analysis computing entity 106 can removing one or more irrelevant sentences from the contextual summary using a machine-learning based irrelevant classifier model. By way of example, the predictive data analysis computing entity 106 can process the contextual summary using the machine-learning based irrelevant classifier model to remove the one or more irrelevant sentences from the contextual summary.

The machine-learning based irrelevant classifier model can include any type of machine-learning based model including one or more supervised, unsupervised, and/or reinforcement learning models. In some implementations, the machine-learning based irrelevant classifier model can include a machine-learning based classifier model. For instance, the machine-learning based classifier model can include one or more perceptrons, logistic regression models, naïve bayes algorithms, K-nearest Neighbors, support vector machines, and/or the like.

The machine-learning based classifier model can be previously trained to classify each sentence of a contextual summary as relevant or irrelevant with respect to the key sentences. The machine-learning based irrelevant classifier model can be applied to each sentence of the contextual summary to identify the one or more irrelevant sentences. For instance, the machine-learning based irrelevant classifier model can individually process each respective sentence of the contextual summary to individually classify the sentence as relevant or irrelevant. The predictive data analysis computing entity 106 can remove each sentence from the contextual summary that is classified as irrelevant. In this manner, the machine-learning based irrelevant classifier model can be used to remove sentences from contextual summary that are not related to the key sentences for the contextual summary.

At step/operation 802, the process 800 can include generating a paraphrased contextual summary based on the contextual summary. For example, the predictive data analysis computing entity 106 can generate the paraphrased contextual summary using a machine-learning based paraphraser model. By way of example, the predictive data analysis computing entity 106 can process the contextual summary using a machine-learning based paraphraser model to generate the paraphrased contextual summary. The paraphrased contextual summary can include a plurality of sentences of the contextual summary with one or more phrases added or removed to increase a readability of the contextual summary.

The machine-learning based paraphraser model can include any type of machine-learning based model including one or more supervised, unsupervised, and/or reinforcement learning models. In some implementations, the machine-learning based paraphraser model can include a machine-learning based abstractive text summarization model. For instance, the machine-learning based abstractive text summarization model can include one or more neural networks (e.g., feedforward artificial neural networks, perceptron and multilayer perceptron neural networks, radial basis function artificial neural networks, recurrent neural networks, modular neural networks, etc.), transformer models, and/or any other abstractive natural language processing model. In some embodiments, the machine-learning based abstractive text summarization model can include a sequence-to-sequence model.

In some embodiments, the contextual summary can be generated using one or more extractive summarization techniques and can include raw textual snippets that can lack coherency. The machine-learning based paraphraser model can be applied the contextual summary to paraphrase the contextual summary for improved readability and smoothness of the contextual summary. This can include removing one or more redundant phrases and/or augmenting the contextual summary with one or more transitioning words and/or phrases.

The machine-learning based paraphraser model can include a pretrained paraphraser model and/or text style transfer model. In addition, or alternatively, prompt/transfer learning can be used to tune a language processing model such as BERT, T5, BART, Pegasus, etc. for conditional generation of natural sequences.

The machine-learning based paraphraser model can be trained using a training dataset. The training data set can include a plurality of training transcripts and a plurality of corresponding training summaries. A training summary, for example, can include a previously generated summary for a corresponding training transcript. A plurality of training transcript-summary pairs can be selected from a plurality of historical call transcripts and historical summaries based at least in part on one or more metrics for the training summaries of the plurality of training transcript-summary pairs. The one or more metrics can be indicative of a conciseness, readability, contextual information, and/or any other aspect representative of an optimal summary for a multi-party interaction. The one or more metrics can be based at least in part on one or more compliance criteria, repeat call handling criteria, issue resolution criteria, escalation handling criteria, and/or any other criteria that is applicable to a respective multi-party interaction.

In some embodiments, the training data set can be automatically generated by comparing each sentence in a training transcript to each sentence in a corresponding training summary. For example, one or more terms for each sentence in the training transcript can be assigned a label descriptive of whether the terms are relevant in an optimal summary. The relevancy of a respective term can be determined by calculating a Rouge score for each bigram in a transcript-summary sentence pair. A respective term can be assigned a relevant label if the highest Rouge score for the bigrams corresponding to the respective term is above a threshold Rouge score (e.g., 0.5).

FIG. 9 provides an operational example of a paraphrasing process 900 in accordance with some embodiments discussed herein. The paraphrasing process 900 can include one or more stages. For instance, the paraphrasing process 900 can include an initial paraphrasing stage 905 and/or a hallucinated content removal stage 910.

During the initial paraphrasing stage 905, the predictive data analysis computing entity 106 can process the contextual summary to generate the paraphrased contextual summary 915. In some embodiments, the predictive data analysis computing entity 106 can individually process each sentence of the contextual summary to generate the paraphrased contextual summary 915.

For example, the predictive data analysis computing entity 106 select an input sentence 920 from the contextual summary and individually process the input sentence 920 using the machine-learning based paraphraser model to generate a paraphrased sentence 925 corresponding the input sentence. This process can be repeated for each sentence of the contextual summary to generate the paraphrased contextual summary 915.

In this manner, the machine-learning based paraphraser model can be individually applied to each sentence of the contextual summary to reduce the generation of hallucinated content. As noted herein, one potential downside to some abstractive natural language processing models such as, for example, sequence to sequence models, can be their introduction of hallucinated content that can impact the meaning of the original interaction. By splitting the contextual summary into multiple sentences and paraphrasing each sentence individually, the predictive data analysis computing entity 106 can improve upon conventional abstractive natural language processing techniques by providing for better control over hallucinated content, resulting in improved sentence smoothing results.

In some embodiments, the predictive data analysis computing entity 106 can process the paraphrased contextual summary using the machine-learning based speech converter model to generate the reported contextual summary for the multi-party interaction transcript data object. In addition, or alternatively, the predictive data analysis computing entity 106 can further process the paraphrased contextual summary before applying the machine-learning based speech converter model.

For example, returning to FIG. 8, at step/operation 803, the process 800 can include removing one or more hallucinated terms from the paraphrased contextual summary. For example, the predictive data analysis computing entity 106 can remove the one or more hallucinated terms from the paraphrased contextual summary. By way of example, the predictive data analysis computing entity 106 can process the paraphrased contextual summary using a machine-learning based hallucinated content model to remove at least a portion of hallucinated content from the paraphrased contextual summary. The hallucinated content, for example, can include one or more terms and/or phrases added to the paraphrased contextual summary.

The machine-learning based hallucinated content model can include any type of machine-learning based model including one or more supervised, unsupervised, and/or reinforcement learning models. In some implementations, the machine-learning based hallucinated content model can include a machine-learning based classifier model. For instance, the machine-learning based classifier model can include one or more perceptrons, logistic regression models, naïve bayes algorithms, K-nearest Neighbors, support vector machines, and/or the like.

The machine-learning based classifier model can be previously trained to output a hallucination prediction using one or more supervised training techniques. For instance, in some embodiments, the machine-learning based classifier model can be previously trained using synthetic labelled training data. The synthetic labelled training data can be generated from historical multi-party interaction transcripts. The synthetic labelled training data can include a plurality of labels identifying whether each word in a historical paraphrased contextual summary is hallucinated.

The machine-learning based classifier model can process the paraphrased contextual summary to predict a hallucination prediction for each term in the paraphrased contextual summary. The machine-learning based classifier model can assign a hallucination prediction to each term of the paraphrased contextual summary. A term can be classified as hallucinated content if the term was added by the machine-learning based paraphraser model and is predicted to impact the meaning of the contextual summary. The predictive data analysis computing entity 106 can remove each term that is classified as hallucinated content from the paraphrased contextual summary.

By way of example, with reference to FIG. 9, the one or more hallucinated terms can be removed from the paraphrased contextual summary during the hallucinated content removal stage 910. As illustrated by FIG. 9, the predictive data analysis computing entity 106 can identify each paraphrased term 930 in each paraphrased sentence 925 of the paraphrased contextual summary 915. The predictive data analysis computing entity 106 can input each paraphrased term 930 to the machine-learning based hallucinated content model 935 and receive, as an output of the machine-learning based hallucinated content model 935 a hallucination classification 940 for each paraphrased term 930. The predictive data analysis computing entity 106 can remove paraphrased terms classified as hallucinated from the paraphrased contextual summary 915 to generate an updated paraphrased contextual summary 945.

Returning to FIG. 8, at step/operation 804, the process 800 can include generating the reported contextual summary for the multi-party interaction transcript data object based on the paraphrased contextual summary. For example, the predictive data analysis computing entity 106 can generating the reported contextual summary for the multi-party interaction transcript data object using machine-learning based speech converter model. By way of example, the predictive data analysis computing entity 106 can process the paraphrased contextual summary using the machine-learning based speech converter model to generate the reported contextual summary for the multi-party interaction transcript data object. The machine-learning based speech converter model can be pretrained using historical multi-party interaction transcripts and/or reported contextual summaries corresponding thereto.

FIG. 10 provides an operational example of a training process 1000 for the machine-learning based speech converter model 1010 in accordance with some embodiments discussed herein. The machine-learning based speech converter model 1010 can be pretrained using one or more training techniques.

The machine-learning based speech converter model 1010 can be trained to convert input sentences 1005 from a direct speech to a reported sentence 1015 in an indirect speech. The machine-learning based speech converter model 1010 can be trained using a training dataset including a plurality of training input sentences 1020 and a plurality of training reported sentences 1025. The training dataset can include a plurality of labeled training sequences, each including a pair of training input sentences and training reported sentences. As one example, the training dataset can include thirty-five labeled training sequences and ten testing sequences.

In some embodiments, the machine-learning based speech converter model 1010 can include a sequence-to-sequence (e.g., a text-to-text transformer, etc.) machine-learning based model trained using one or more prompt tuning techniques. For example, the plurality of training reported sentences 1025 can be utilized as the prompt for prompt tuning.

FIG. 11 provides an operational example of a speech converter process 1100 using the machine-learning based speech converter model 1010 in accordance with some embodiments discussed herein. During runtime, the machine-learning based speech converter model 1010 can be utilized to convert input sentences 1105 from a direct speech (e.g., in which it was transcribed) to corresponding reported sentences 1110 in an indirect speech (e.g., in which the information is recorded from one participant's point of view). For example, in an interaction between a caller and an agent, the machine-learning based speech converter model 1010 can be utilized to convert input sentences 1105 from direct speech to a reported speech from the perspective of an agent memorializing the interaction. In this manner, the machine-learning based speech converter model 1010 can be utilized to generate an "Agent-Like" reported contextual summary.

In some embodiments, the predictive data analysis computing entity 106 can individually process each sentence of a summary (e.g., contextual, paraphrased, etc.) with the machine-learning based speech converter model 1010 to generate the reported contextual summary. For instance, the summary can be split into multiple sentences and each sentence can be converted from direct speech to reported speech individually.

For example, the predictive data analysis computing entity 106 can select an input sentence 1115 from the summary and individually process the input sentence 1115 using the machine-learning based speech converter model 1010 to generate a reported sentence 1120 corresponding the input sentence 1115. This process can be repeated for each sentence of the summary to generate a reported contextual summary.

Returning to FIG. 8, at step/operation 805, the process 800 can include removing one or more redundant phrases from the indirect contextual summary. For example, the predictive data analysis computing entity 106 can remove the one or more redundant phrases from the indirect contextual summary. By way of example, the predictive data analysis computing entity 106 can process the reported contextual summary for the multi-party interaction transcript object to remove the one or more redundant phrases from the reported contextual summary.

FIG. 12 provides an operational example of a reported contextual summary 1205 in accordance with some embodiments discussed herein. The reported contextual summary 1205 can include one or more redundant phrases 1215. The predictive data analysis computing entity 106 can apply a natural language processing algorithm to the reported contextual summary 1205 to remove the one or more redundant phrases 1215 from the reported contextual summary 1205. The natural language processing algorithm, for example, can include regular expression algorithm (e.g., REGEX). The regular expression algorithm can be applied to removed secondary occurrences of the reported language leaving only the first occurrence for each segment as illustrated by the post-processed reported contextual summary 1210 of FIG. 12.

FIG. 13 is a flowchart diagram of an example process 1300 for initiating an action based at least in part on a reported contextual summary. Via the various steps/operations of the process 1300, the predictive data analysis computing entity 106 can automatically initiate an action based at least in part on an accurate reported contextual summary. In some embodiments, the process 1300 can include a plurality of operations subsequent to operation 405 of FIG. 4, where the process 400 includes processing the contextual summary to generate the reported contextual summary for the multi-party interaction transcript data object.

At step/operation 1301, the process 1300 can include identifying one or more call attributes associated with the multi-party interaction transcript data object. For example, the predictive data analysis computing entity 106 can identify the one or more call attributes associated with the multi-party interaction transcript data object based at least in part on one or more key words/terms of the multi-party interaction transcript data object, annotations provided by one or more participants to the multi-party interaction transcript data object, meta-data corresponding to the multi-party interaction transcript data object, and/or any other content associated with the multi-party interaction transcript data object. The one or more call attributes can include participant attributes indicative of a participant's identity (e.g., member/agent identification and/or profile information, etc.), history, characteristics, metrics, etc. In addition, or alternatively, the one or more call attributes can include timing attributes (e.g., interaction length, time of interaction, etc.), geographical attributes (e.g., location of participant, etc.), issue attributes (e.g., category of issues relevant to the multi-party interaction, etc.), resolution attributes (e.g., category of issues resolution to the multi-party interaction, etc.), and/or any other attributes descriptive of a characteristic of the multi-party interaction.

At step/operation 1302, the process 1300 can include generating a call log including the reported contextual summary and the one or more call attributes. For example, the predictive data analysis computing entity 106 can generate the call log including the reported contextual summary and the one or more call attributes associated with the multi-party interaction transcript data object. In some embodiments, the call log can be stored in a relational database and/or other memory structure for improved interactive recall.

At step/operation 1303, the process 1300 can include initiating, based at least in part on the call log, an action. For example, the predictive data analysis computing entity 106 can initiate, based at least in part on the call log, the action. The action can include at least one of: (i) a performance assessment for the particular participant, (ii) an issue resolution action, and/or (iii) a repeat caller action.

For example, at step/operation 1304, the process 1300 can include performing a performance assessment for a particular participant. For instance, the predictive data analysis computing entity 106 can analyze the reported contextual summary (and/or the corresponding call log) to determine one or more metrics for the particular participant (e.g., an agent, etc.). In some embodiments, the one or more metrics can be associated with an auditing process for the particular participant. The performance assessment can be stored with the call log, provided to a third-party, and/or provided to the particular participant.

As another example, at step/operation 1305, the process 1300 can include performing an issue resolution action. For instance, the predictive data analysis computing entity 106 can analyze the reported contextual summary (and/or the corresponding call log) to determine an action for resolving an issue identified during the multi-party interaction. In some embodiments, the predictive data analysis computing entity 106 can automatically initiate the issue resolution action. In addition, or alternatively, the predictive data analysis computing entity 106 can provide a prompt to at least one participant of the multi-party interaction. The prompt can be indicative of the issue resolution action.

As yet another example, at step/operation 1306, the process 1300 can include performing a repeat caller action. For instance, the predictive data analysis computing entity 106 can analyze the reported contextual summary (and/or the corresponding call log) to detect an occurrence of a repeat participant. A repeat participant, for example, can be indicative of a participant that is associated with one or more historical multi-party interactions. Responsive to the detection of the repeat participant, the predictive data analysis computing entity 106 can initiate a repeat caller action by notifying at least one participant (e.g., an agent, etc.) of the multi-party interaction, assigning a priority classification to the reported contextual summary, etc.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for automatically generating a summary of a multi-party interaction using natural language processing, the computer-implemented method comprising:
   receiving a multi-party interaction transcript data object comprising a plurality of interaction utterances from at least two participants of the multi-party interaction transcript data object, wherein an interaction utterance comprises one or more sequential sentences associated with one of the at least two participants of the multi-party interaction transcript data object;
   identifying, using an extractive summarization model, a key sentence of the multi-party interaction transcript data object;
   identifying, from the multi-party interaction transcript data object, a particular interaction utterance of the plurality of interaction utterances that corresponds to the key sentence;
   generating a contextual summary for the multi-party interaction transcript data object based at least in part on the particular interaction utterance; and
   generating, using a machine-learning based speech converter model, a reported contextual summary based at least in part on the contextual summary, wherein the reported contextual summary comprises the contextual summary from a perspective of a particular participant.

2. The computer-implemented method of claim 1, wherein generating the reported contextual summary comprises:
   generating, using a machine-learning based paraphraser model, a paraphrased contextual summary based at least in part on the contextual summary, wherein the paraphrased contextual summary comprises a plurality of sentences of the contextual summary with one or more phrases removed; and
   generating, using the machine-learning based speech converter model, the reported contextual summary based at least in part on the paraphrased contextual summary.

3. The computer-implemented method of claim 2, wherein the machine-learning based paraphraser model comprises a machine-learning based abstractive text summarization model.

4. The computer-implemented method of claim 2, wherein generating the reported contextual summary comprises:
selecting a sentence from the contextual summary; and
individually processing the sentence using the machine-learning based paraphraser model.

5. The computer-implemented method of claim 2, wherein generating the reported contextual summary comprises:
removing, using a machine-learning based hallucinated content model, at least a portion of hallucinated content from the paraphrased contextual summary.

6. The computer-implemented method of claim 5, wherein the machine-learning based hallucinated content model comprises a machine-learning based classifier model.

7. The computer-implemented method of claim 6, wherein the machine-learning based classifier model is previously trained using synthetic labelled training data.

8. The computer-implemented method of claim 6, wherein the machine-learning based classifier model is configured to generate a hallucination prediction for a term of the contextual summary.

9. The computer-implemented method of claim 1, further comprising:
removing, using a regular expression algorithm, one or more redundant phrases from the reported contextual summary.

10. The computer-implemented method of claim 1, wherein the key sentence is indicative of at least one of: (i) an intention of a respective participant of the at least two participants, or (2) a resolution for the respective participant.

11. The computer-implemented method of claim 1, further comprising:
generating a call log comprising the reported contextual summary and one or more call attributes associated with the multi-party interaction transcript data object.

12. The computer-implemented method of claim 11, further comprising:
initiating, based at least in part on the call log, an action, the action comprising at least one of: (i) a performance assessment for the particular participant, (ii) an issue resolution action, or (iii) a repeat caller action.

13. The computer-implemented method of claim 1, wherein generating the reported contextual summary comprises:
removing, using a machine-learning based irrelevant classifier model, one or more irrelevant sentences from the contextual summary.

14. A system for automatically generating a summary of a multi-party interaction using natural language processing, the system comprising at least one processor and at least one memory including program code, the at least one memory and the program code configured to, with the at least one processor, cause the system to at least:
receive a multi-party interaction transcript data object comprising a plurality of interaction utterances from at least two participants of the multi-party interaction transcript data object, wherein an interaction utterance comprises one or more sequential sentences associated with one of the at least two participants of the multi-party interaction transcript data object;
generate, using an extractive summarization model, a key sentence of the multi-party interaction transcript data object;
identify, from the multi-party interaction transcript data object, a particular interaction utterance of the plurality of interaction utterances that corresponds to the key sentence;
generate a contextual summary for the multi-party interaction transcript data object based at least in part on the particular interaction utterance; and
generate, using a machine-learning based speech converter model, a reported contextual summary based at least in part on the contextual summary, wherein the reported contextual summary comprises the contextual summary from a perspective of a particular participant.

15. The system of claim 14, wherein the machine-learning based speech converter model individually processes a respective sentence of the contextual summary.

16. The system of claim 14, further caused to at least:
generate, using a machine-learning based paraphraser model, a paraphrased contextual summary based at least in part on the contextual summary, wherein the paraphrased contextual summary comprises a plurality of sentences of the contextual summary with one or more phrases removed; and
generate, using the machine-learning based speech converter model, the reported contextual summary based at least in part on the paraphrased contextual summary.

17. The system of claim 16, wherein the machine-learning based paraphraser model individually processes a respective sentence of the contextual summary.

18. The system of claim 14, further caused to at least:
remove, using a machine-learning based irrelevant classifier model, one or more irrelevant sentences from the contextual summary.

19. The system of claim 18, wherein the machine-learning based irrelevant classifier model individually processes a respective sentence of the contextual summary.

20. A computer program product for generating a summary of a multi-party interaction using natural language processing, the computer program product comprising at least one non-transitory computer-readable storage medium having computer-readable program code portions stored therein that, when executed by one or more processors, cause the one or more processors to:
receive a multi-party interaction transcript data object comprising a plurality of interaction utterances from at least two participants of the multi-party interaction transcript data object, wherein an interaction utterance comprises one or more sequential sentences associated with one of the at least two participants of the multi-party interaction transcript data object;
generate, using an extractive summarization model, a key sentence of the multi-party interaction transcript data object;
identify, from the multi-party interaction transcript data object, a particular interaction utterance of the plurality of interaction utterances that corresponds to the key sentence;
generate a contextual summary for the multi-party interaction transcript data object based at least in part on the particular interaction utterance; and
generate, using a machine-learning based speech converter model, a reported contextual summary based at least in part on the contextual summary, wherein the reported contextual summary comprises the contextual summary from a perspective of a particular participant.

* * * * *